(12) United States Patent
Wong et al.

(10) Patent No.: US 11,580,086 B2
(45) Date of Patent: Feb. 14, 2023

(54) TACTIC TRACKING, EVALUATION AND IDENTIFICATION ENGINE APPARATUSES, METHODS AND SYSTEMS

(71) Applicant: FMR LLC, Boston, MA (US)

(72) Inventors: James Wong, Topsfield, MA (US); Rohan Vaswani, Nashua, NH (US); Nan Li, Quincy, MA (US); Boris Kalinichenko, Jamaica Plain, MA (US); Anton Aboukhalil, Waltham, MA (US)

(73) Assignee: FMR LLC, Boston, MA (US)

( * ) Notice: Subject to any disclaimer, the term of this patent is extended or adjusted under 35 U.S.C. 154(b) by 72 days.

(21) Appl. No.: 16/576,743

(22) Filed: Sep. 19, 2019

(65) Prior Publication Data
US 2021/0089075 A1 Mar. 25, 2021

(51) Int. Cl.
*G06F 16/23* (2019.01)
*G06F 16/9535* (2019.01)
*G06F 16/906* (2019.01)
*G06Q 40/06* (2012.01)

(52) U.S. Cl.
CPC ............ *G06F 16/23* (2019.01); *G06F 16/906* (2019.01); *G06F 16/9535* (2019.01); *G06Q 40/06* (2013.01)

(58) Field of Classification Search
CPC .... G06F 16/23; G06F 16/906; G06F 16/9535; G06Q 40/06
See application file for complete search history.

(56) References Cited

U.S. PATENT DOCUMENTS 9,514,133 B1 * 12/2016 Kursun ................. G06F 40/279
2008/0183639 A1 * 7/2008 DiSalvo ................ G06Q 40/02
705/36 R

OTHER PUBLICATIONS

Manchanda et al., "Mathematical methods for modelling price fluctuations of financial times series," Journal of the Franklin Institute 344.5 (2007): 613-636. (Year: 2007).*

* cited by examiner

*Primary Examiner* — Jay A Morrison
(74) *Attorney, Agent, or Firm* — Hanchuk Kheit LLP.; Walter G. Hanchuk

(57) ABSTRACT

The Tactic Tracking, Evaluation and Identification Engine Apparatuses, Methods and Systems ("TTEIE") transforms subscription request, tick notification request inputs via TTEIE components into subscription response, identified tactic store request, user interface update notification outputs. A subscription request datastructure from a client is obtained. A set of tactic definition datastructures is retrieved. A tick notification comprising tick data for a tick associated with a target is obtained. A contact datastructure corresponding to each retrieved tactic definition datastructure is added to a tracking list of contact datastructures for the target. The tick data for the tick is appended for each contact datastructure in the tracking list. A contact datastructure's time series of ticks is evaluated with regard to the respective contact datastructure's corresponding time series of rules to classify the respective contact datastructure, for each contact datastructure in the tracking list. The client is notified regarding identified tactic contact datastructures.

18 Claims, 17 Drawing Sheets

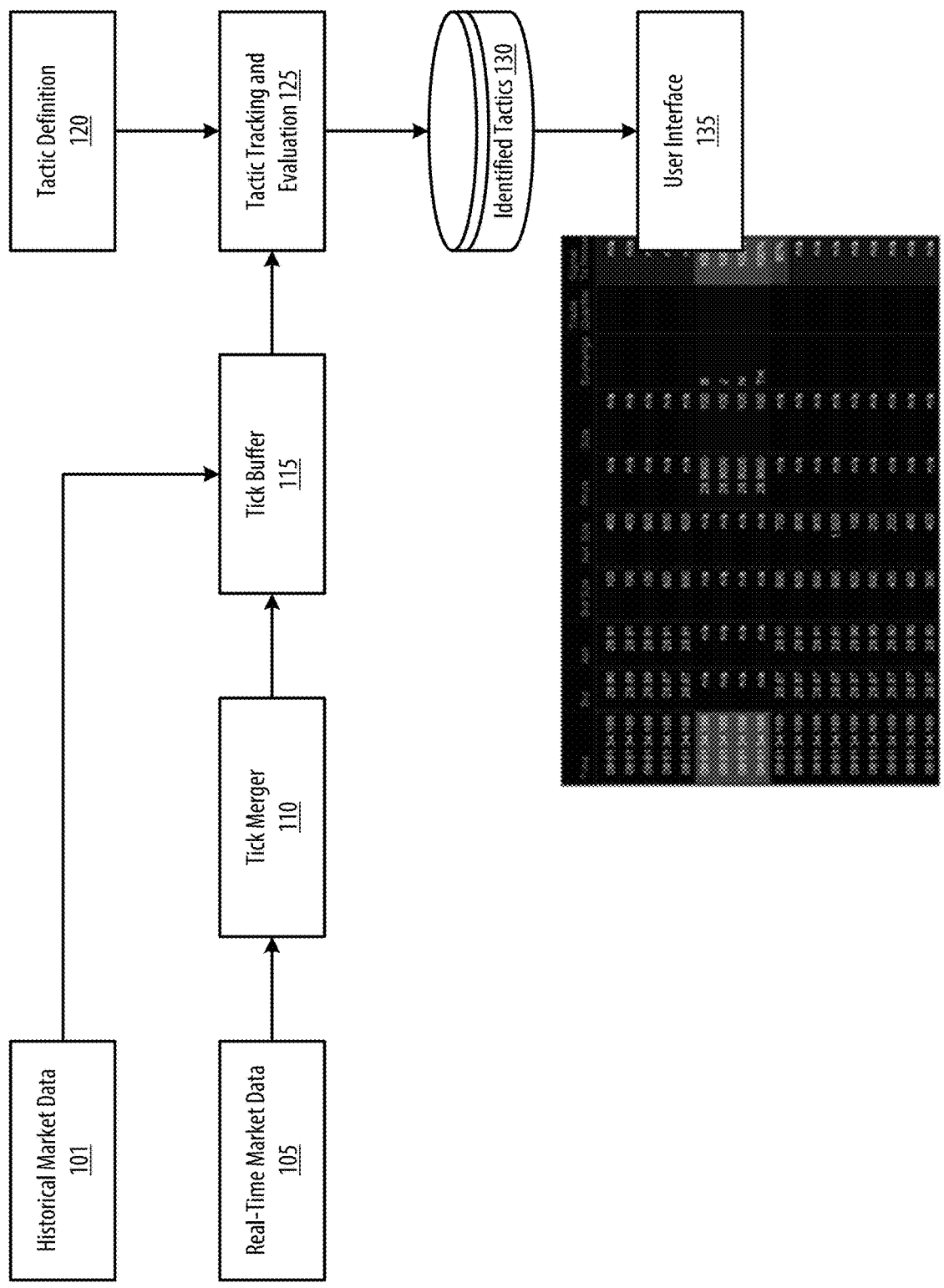
FIGURE 1: TTEIE ARCHITECTURE

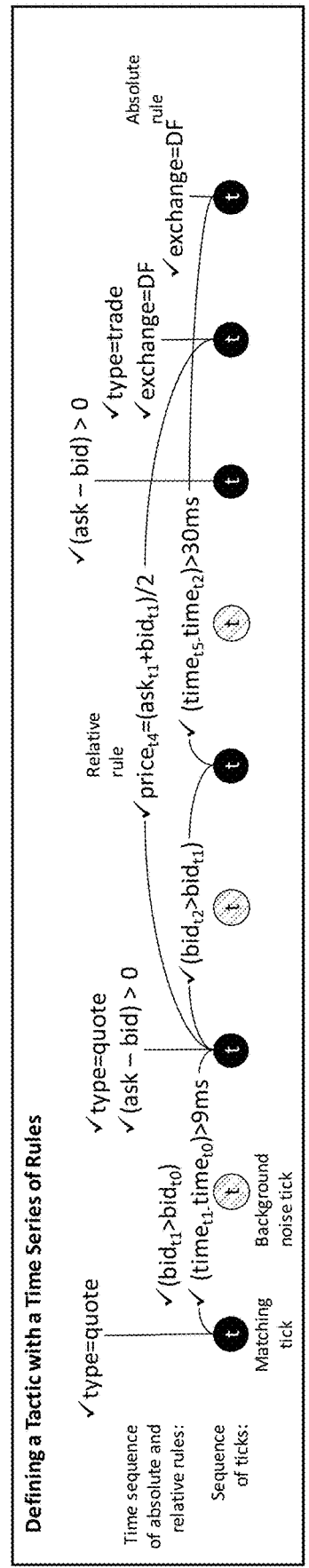
FIGURE 2: TTEIE ARCHITECTURE

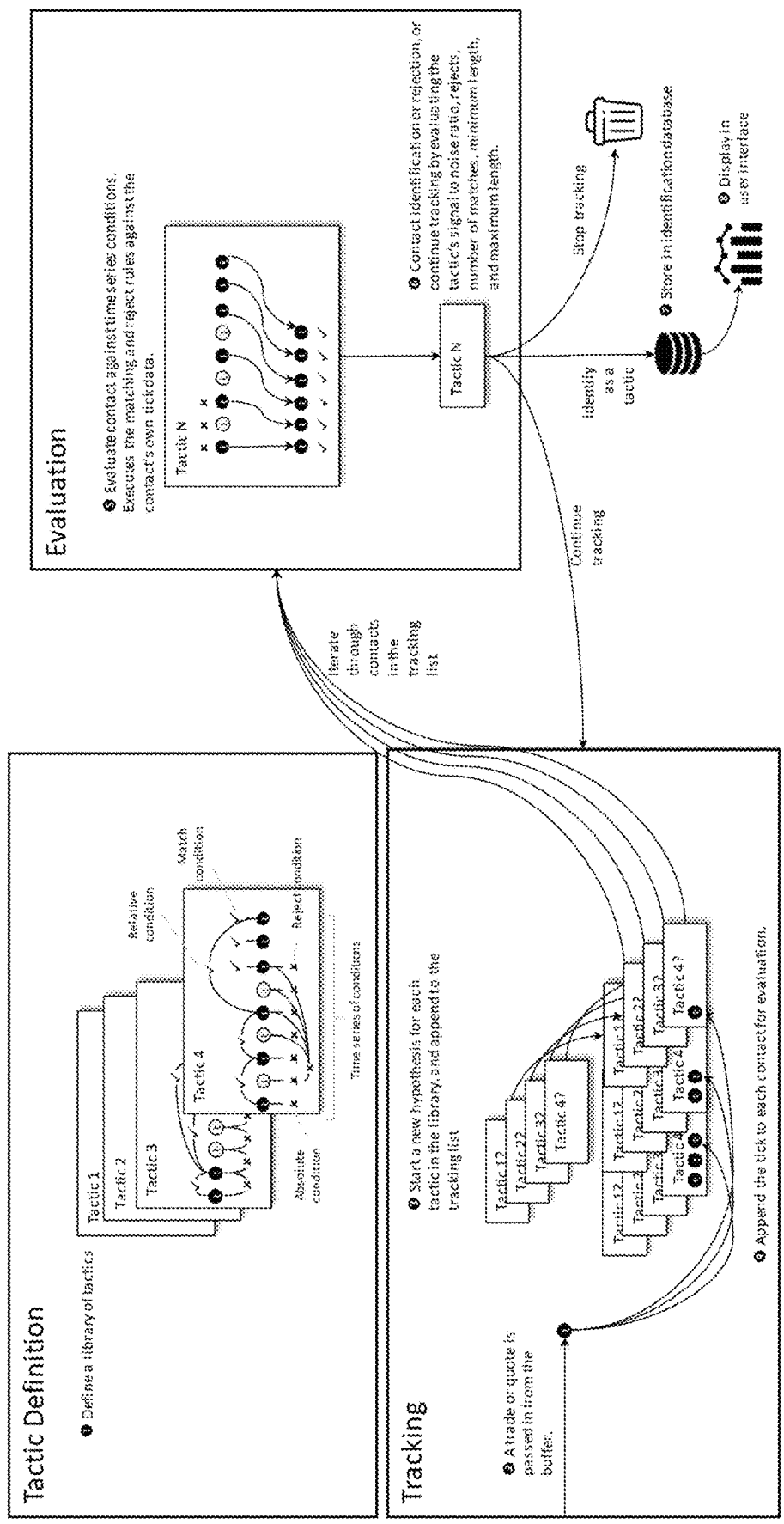
FIGURE 3: TTEIE ARCHITECTURE

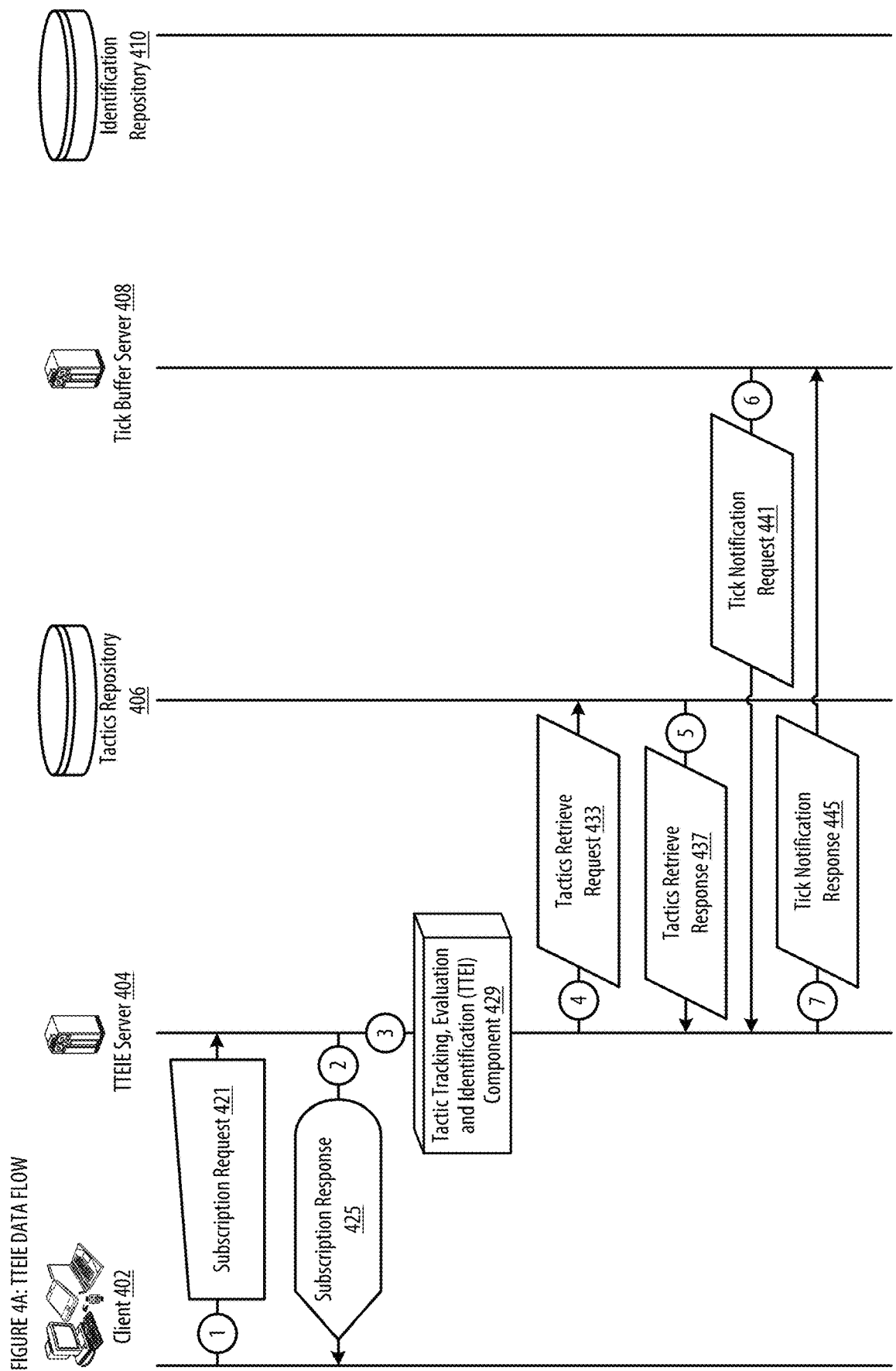

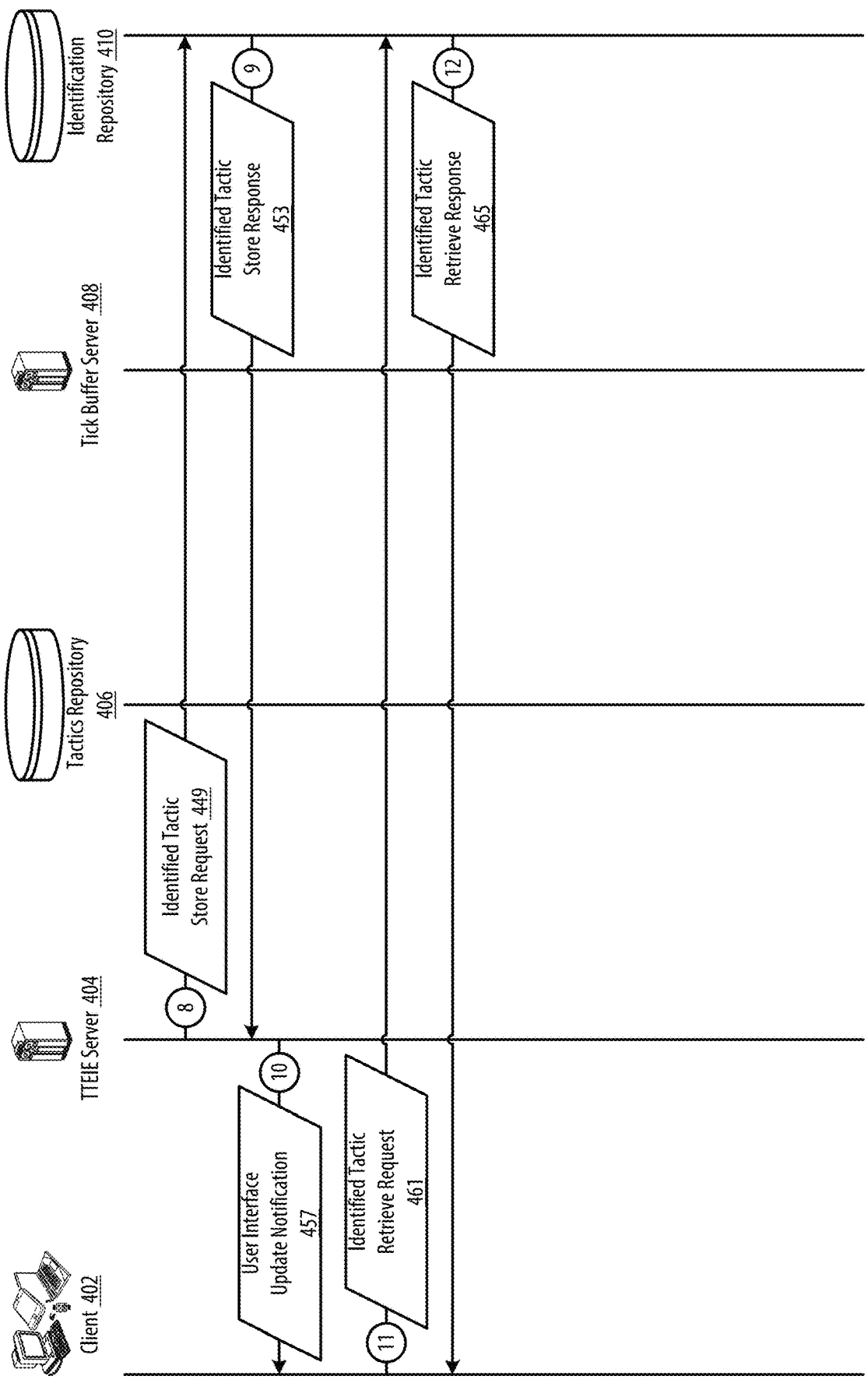

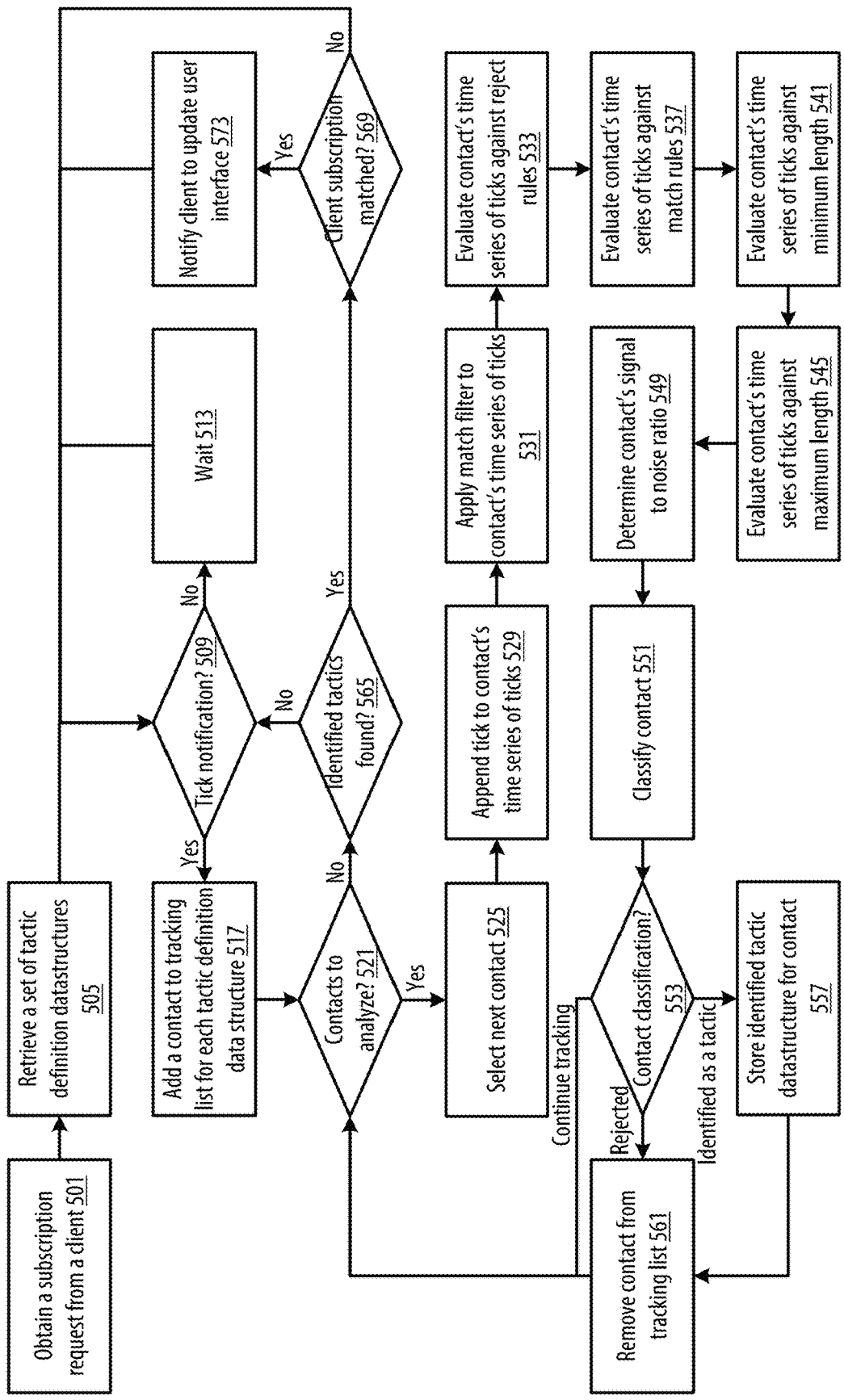

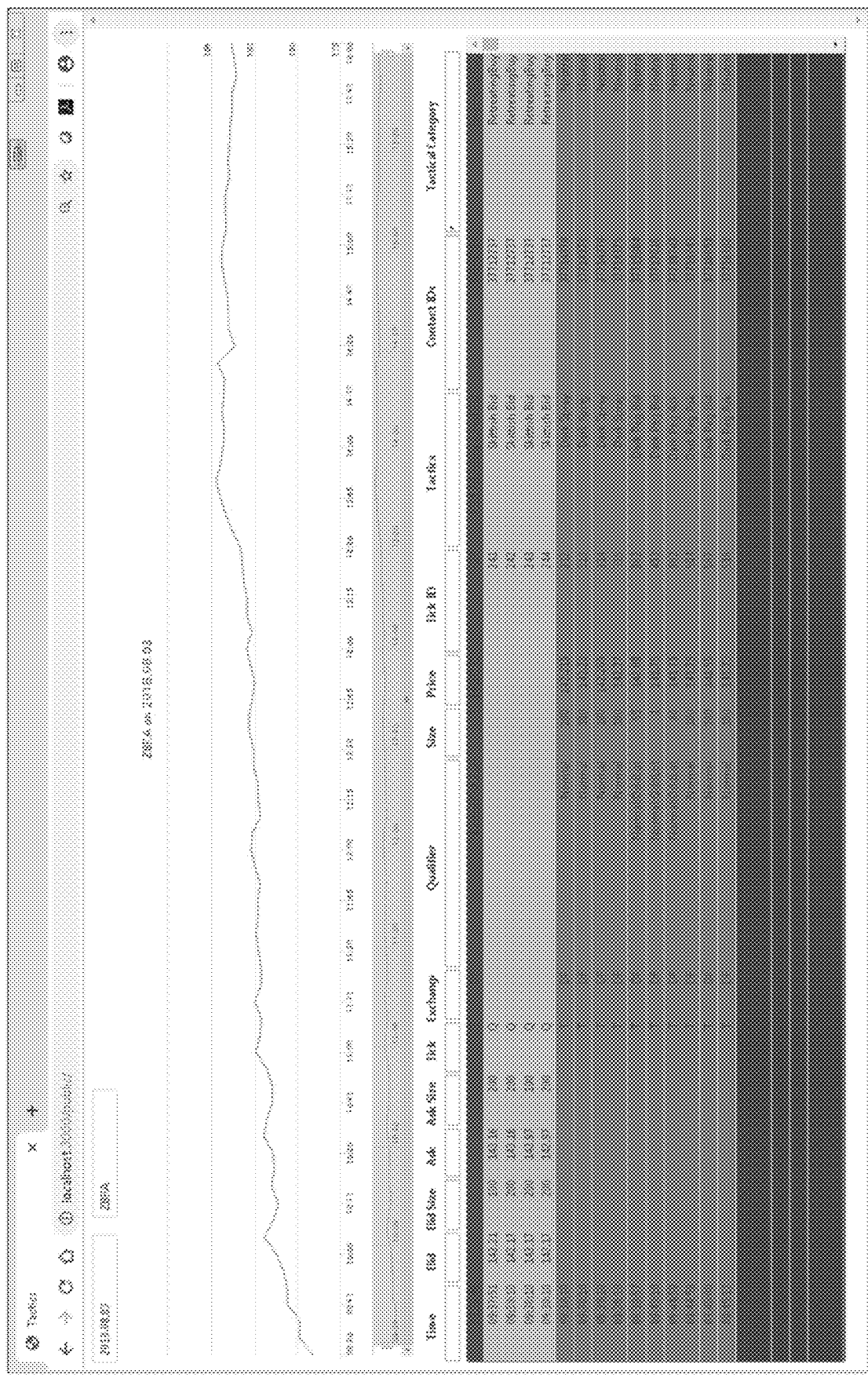
FIGURE 6: TTEIE SCREENSHOT

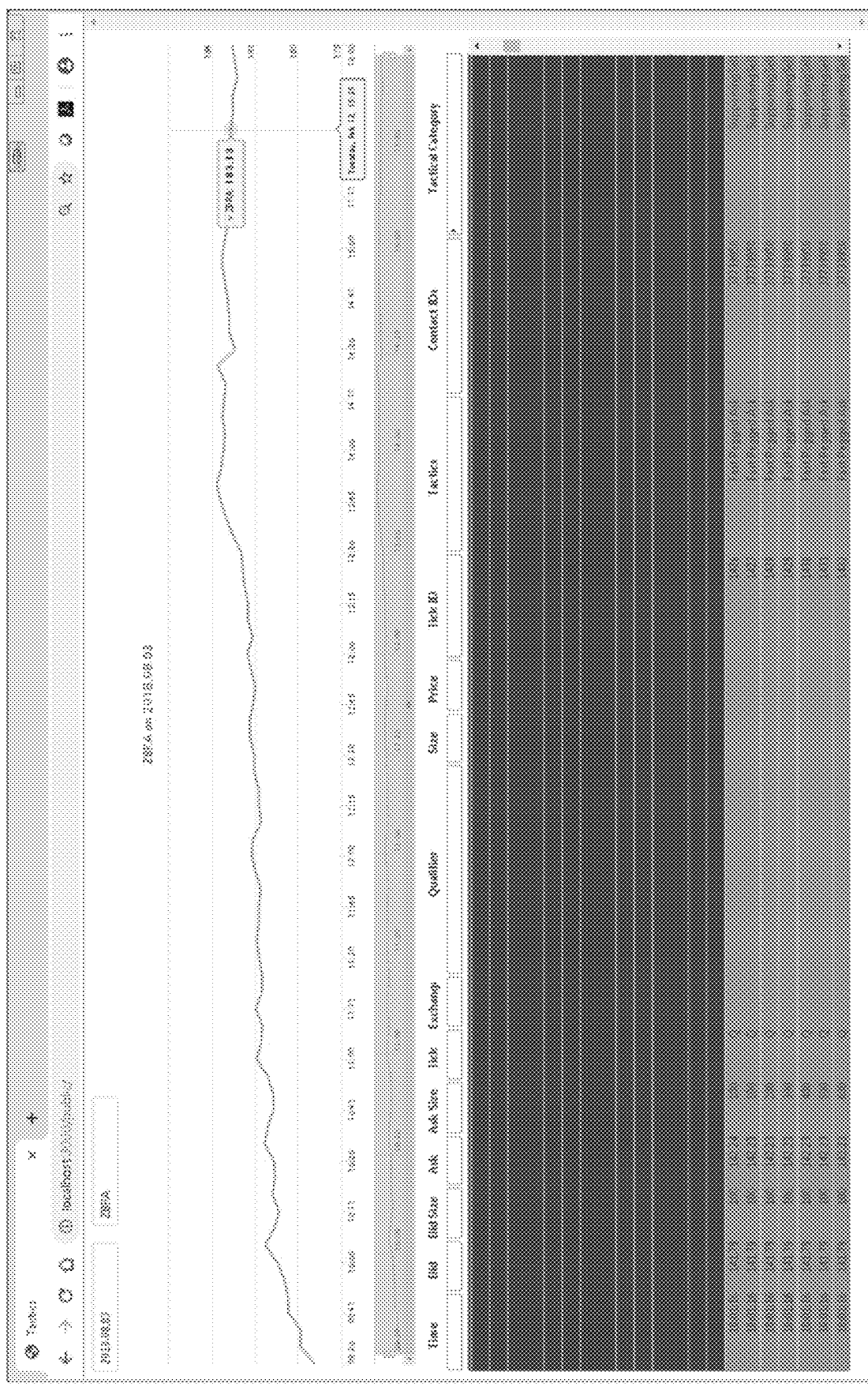
FIGURE 7: TTEIE SCREENSHOT

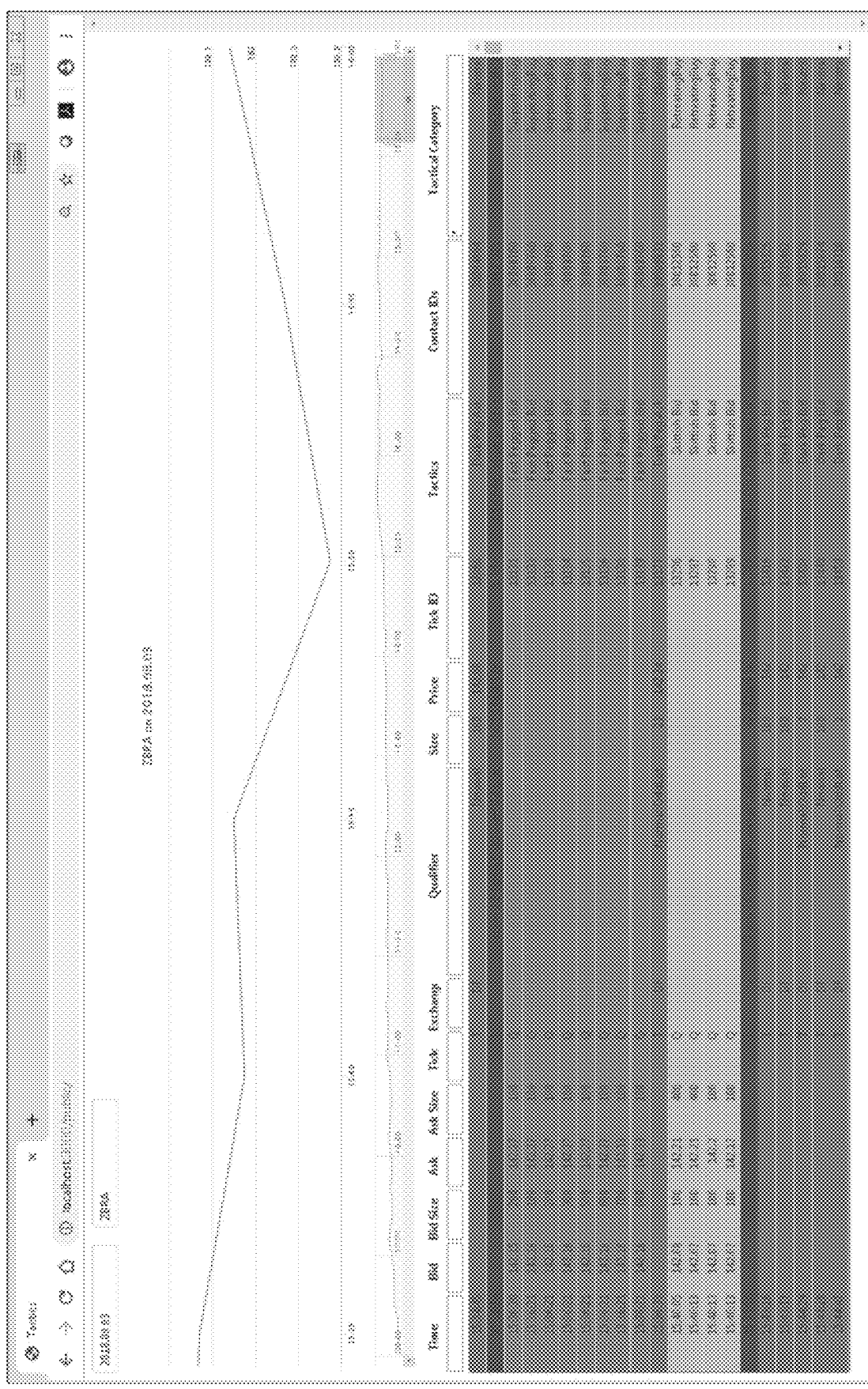
FIGURE 8: TTEIE SCREENSHOT

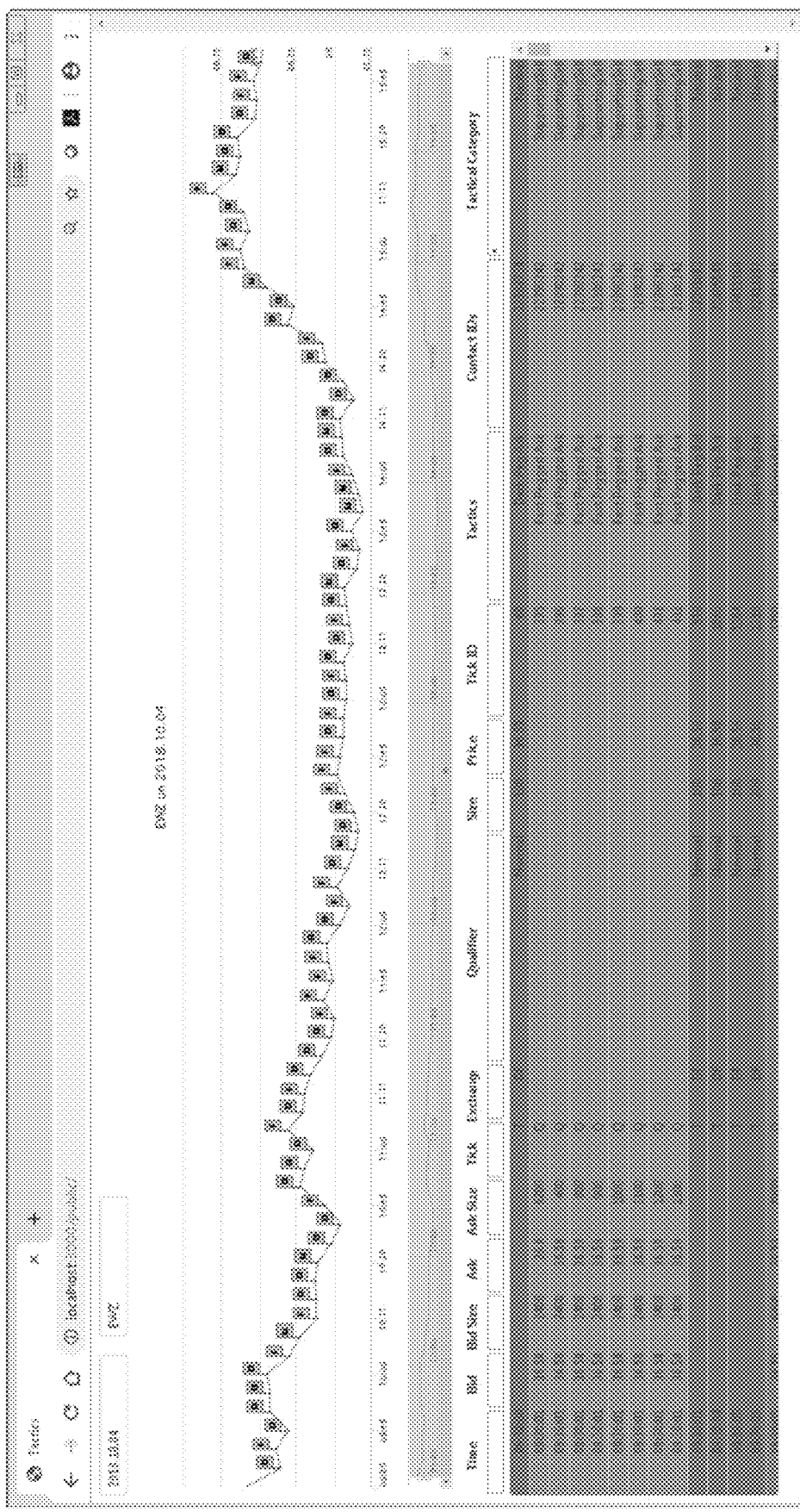
FIGURE 9: TTEIE SCREENSHOT

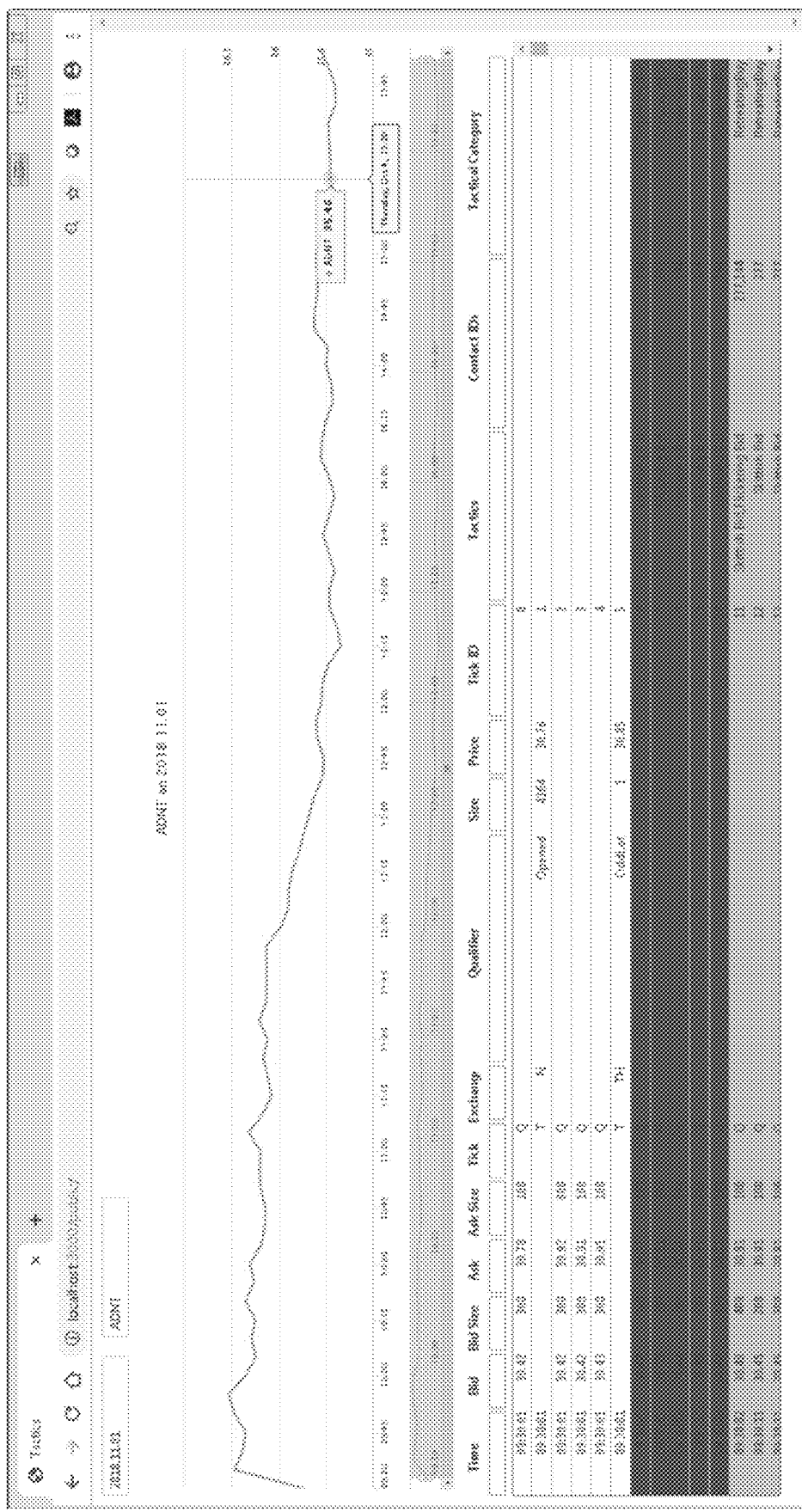
FIGURE 10: TTEIE SCREENSHOT

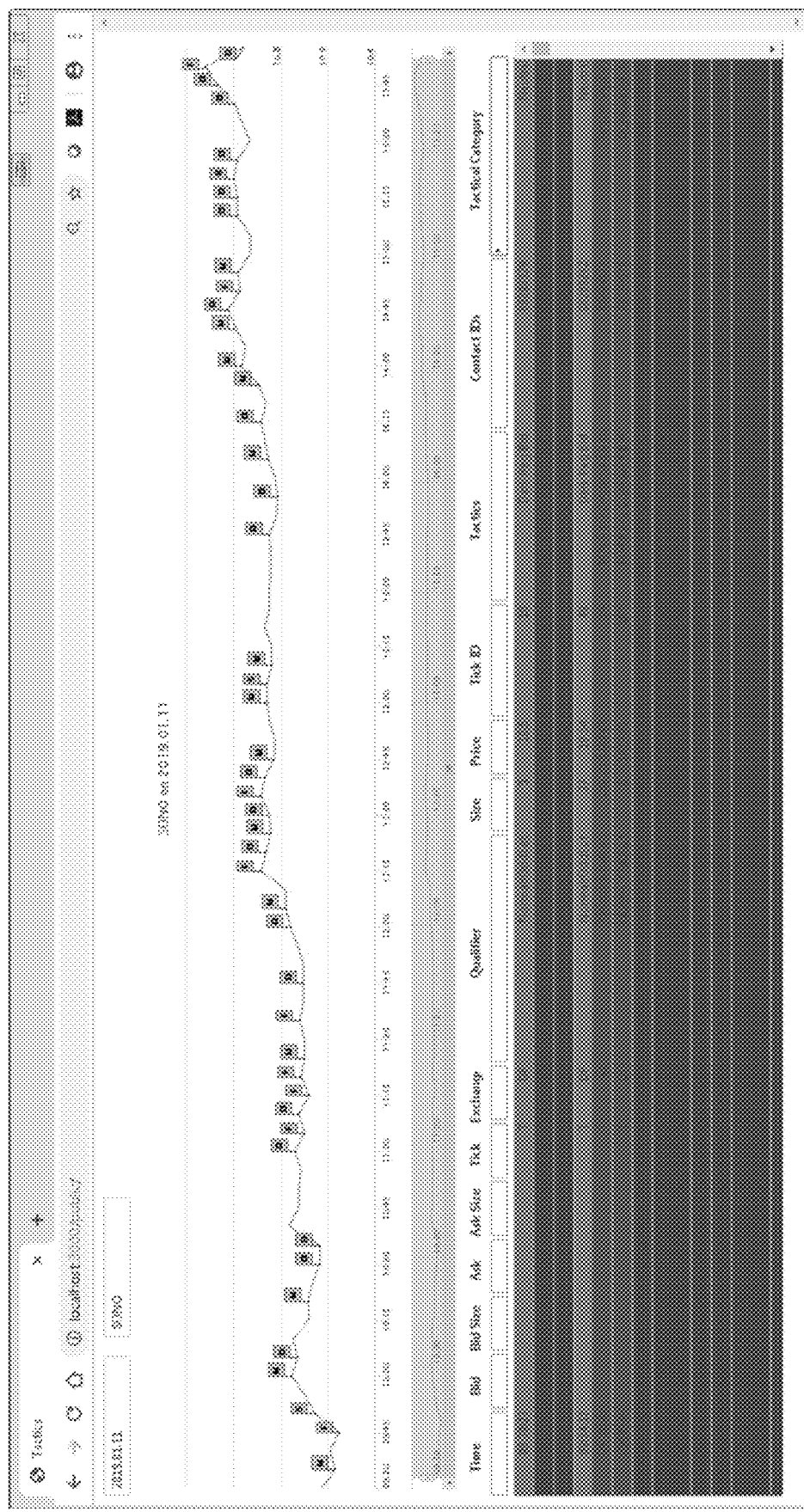
FIGURE 11: TTEIE SCREENSHOT

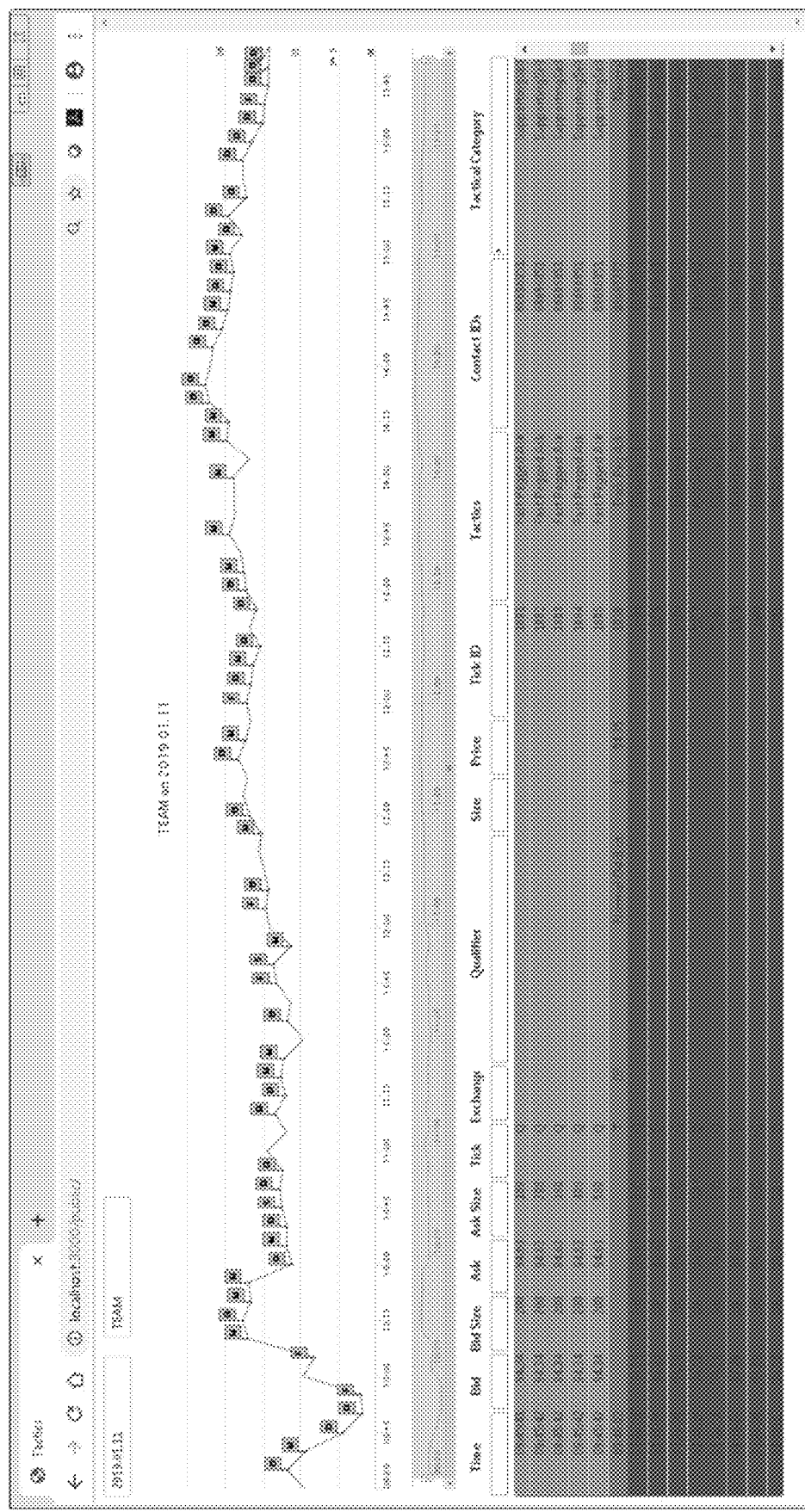
FIGURE 12: TTEIE SCREENSHOT

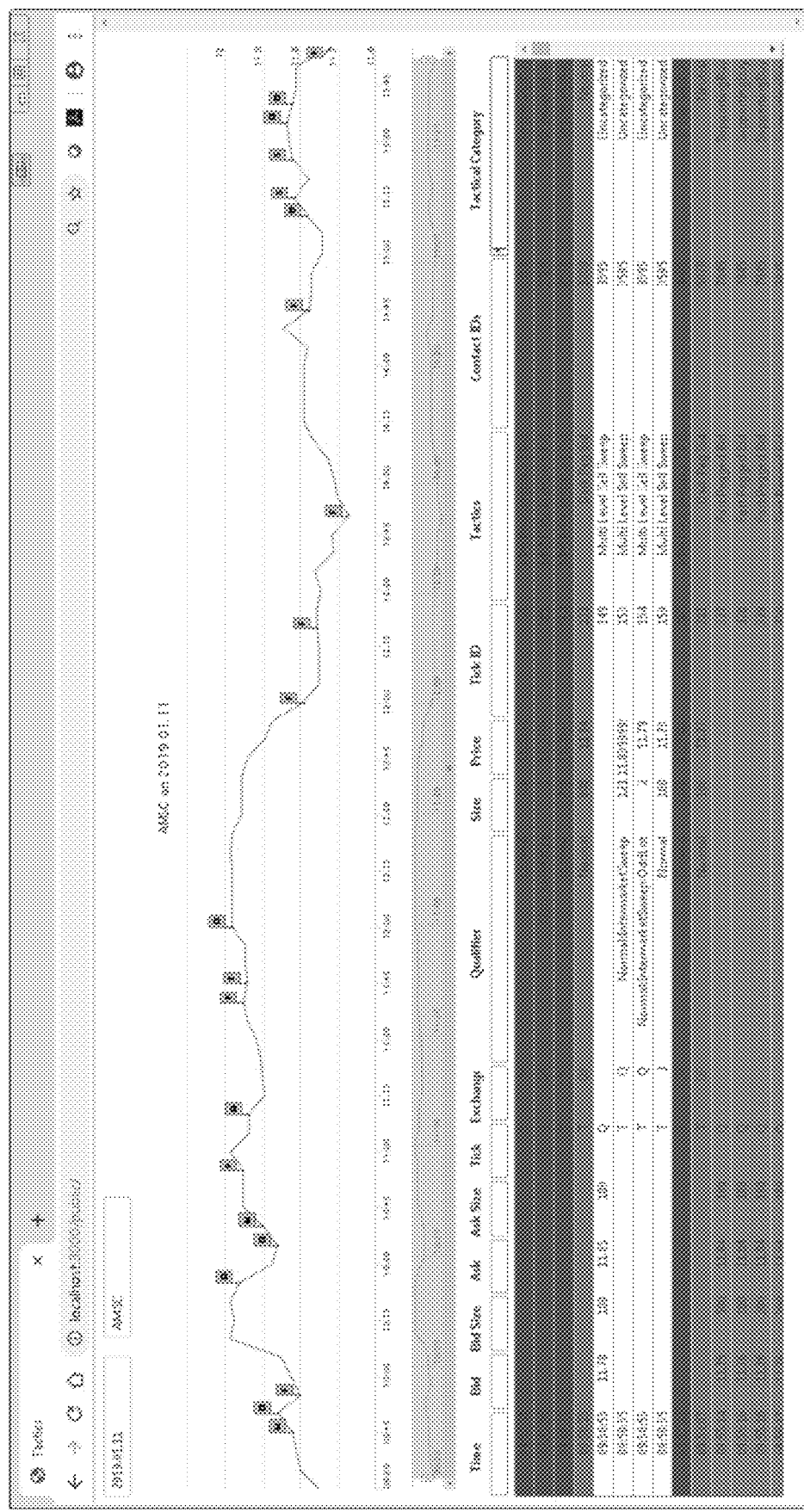
FIGURE 13: TTEIE SCREENSHOT

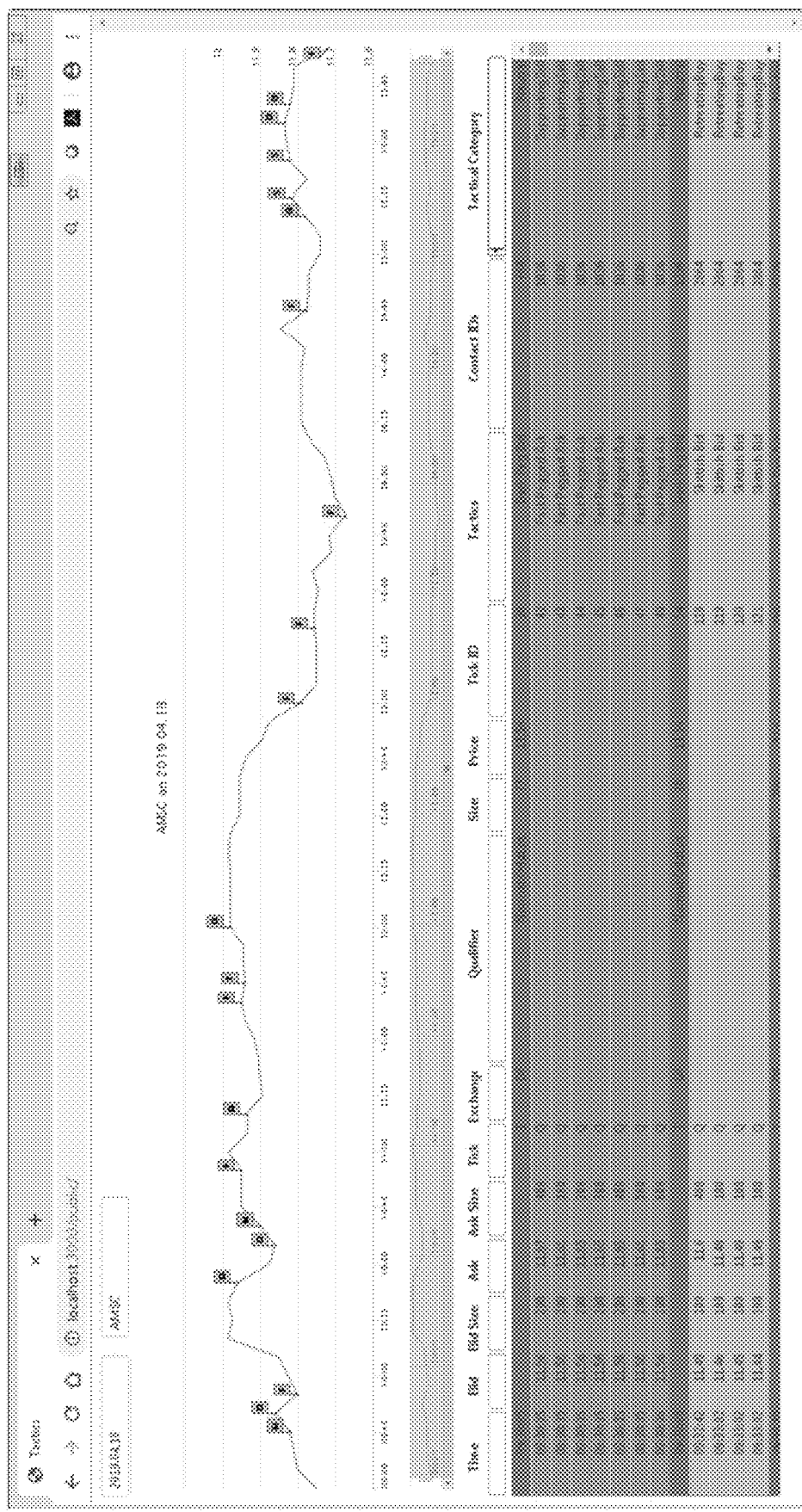
FIGURE 14: TTEIE SCREENSHOT

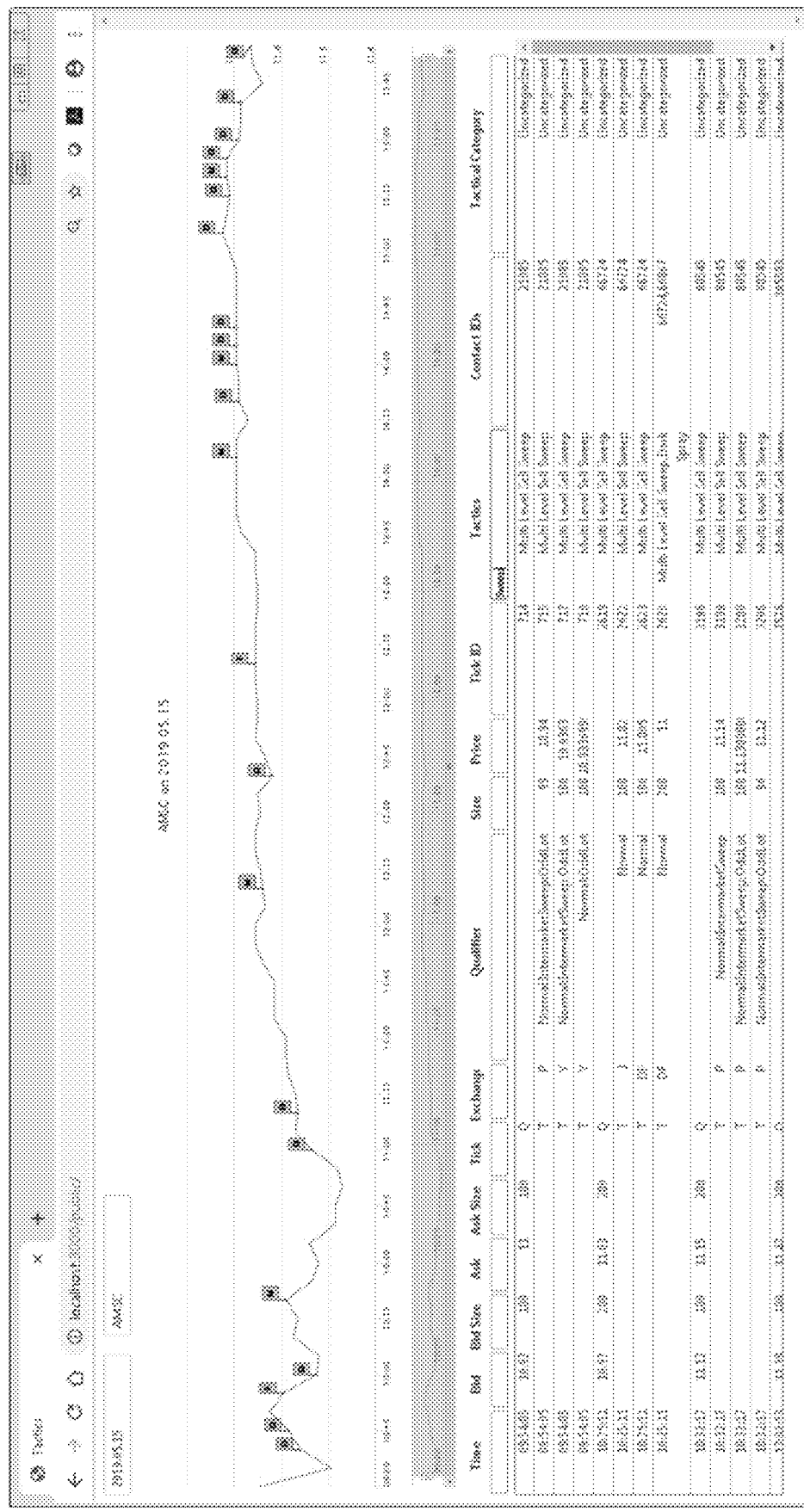
FIGURE 15: TTEIE SCREENSHOT

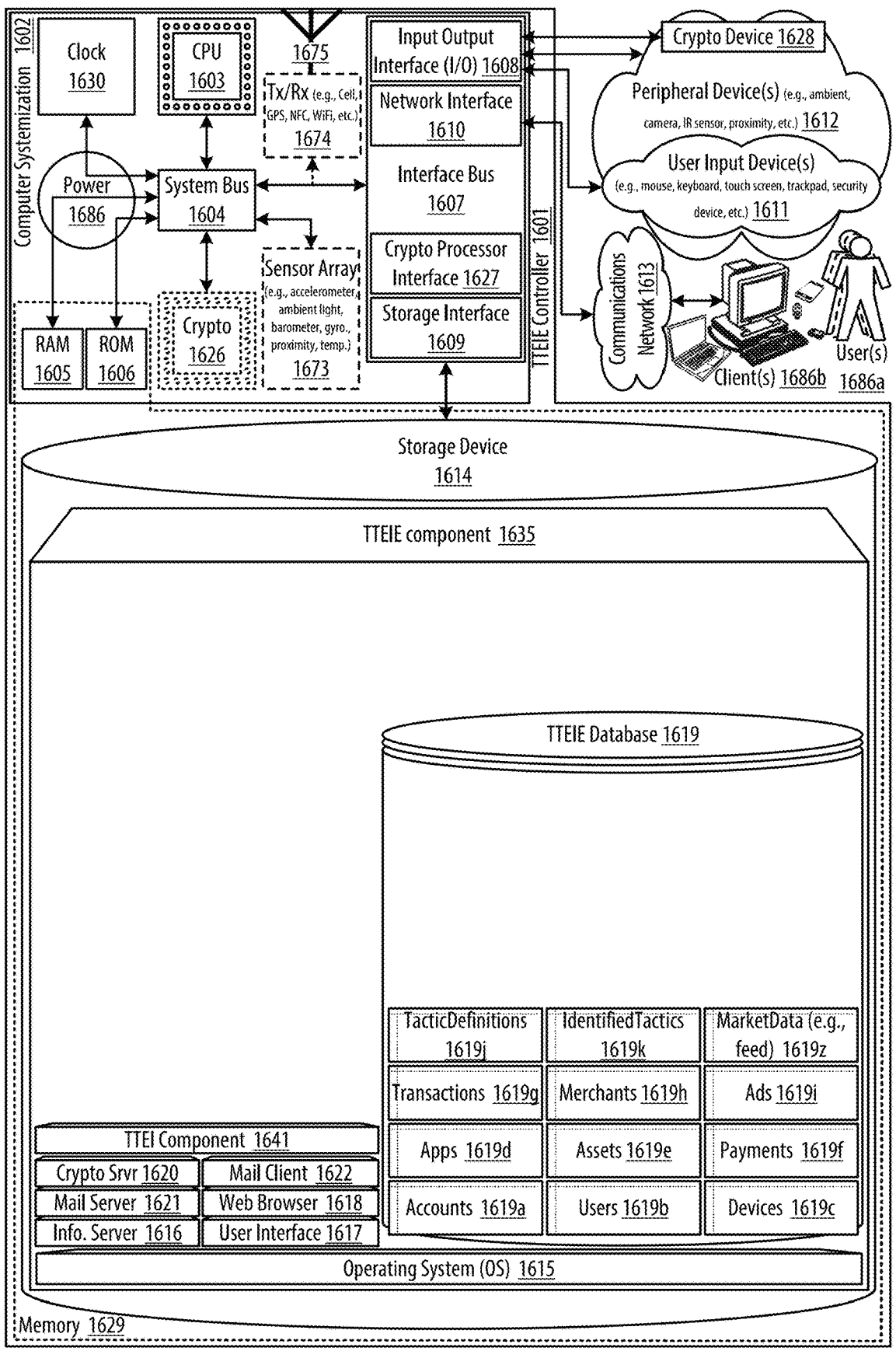
FIGURE 16: TTEIE Controller

TACTIC TRACKING, EVALUATION AND IDENTIFICATION ENGINE APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address search engines, and more particularly, include Tactic Tracking, Evaluation and Identification Engine Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

A variety of search engines are available to users. For example, Google allows users to input a search query and returns relevant web pages based on the content of the query and PageRank scores of crawled web pages.

BRIEF DESCRIPTION OF THE DRAWINGS

Appendices and/or drawings illustrating various, non-limiting, example, innovative aspects of the Tactic Tracking, Evaluation and Identification Engine Apparatuses, Methods and Systems (hereinafter "TTEIE") disclosure, include:

FIG. 1 shows an architecture for the TTEIE;

FIG. 2 shows an architecture for the TTEIE;

FIG. 3 shows an architecture for the TTEIE;

FIGS. 4A-B show a datagraph illustrating data flow(s) for the TTEIE;

FIG. 5 shows a logic flow illustrating embodiments of a tactic tracking, evaluation and identification (TTEI) component for the TTEIE;

FIG. 6 shows a screenshot illustrating user interface(s) of the TTEIE;

FIG. 7 shows a screenshot illustrating user interface(s) of the TTEIE;

FIG. 8 shows a screenshot illustrating user interface(s) of the TTEIE;

FIG. 9 shows a screenshot illustrating user interface(s) of the TTEIE;

FIG. 10 shows a screenshot illustrating user interface(s) of the TTEIE;

FIG. 11 shows a screenshot illustrating user interface(s) of the TTEIE;

FIG. 12 shows a screenshot illustrating user interface(s) of the TTEIE;

FIG. 13 shows a screenshot illustrating user interface(s) of the TTEIE;

FIG. 14 shows a screenshot illustrating user interface(s) of the TTEIE;

FIG. 15 shows a screenshot illustrating user interface(s) of the TTEIE;

FIG. 16 shows a block diagram illustrating embodiments of a TTEIE controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Tactic Tracking, Evaluation and Identification Engine Apparatuses, Methods and Systems (hereinafter "TTEIE") transforms subscription request, tick notification request inputs, via TTEIE components (e.g., TTEI, etc. components), into subscription response, identified tactic store request, user interface update notification outputs. The TTEIE components, in various embodiments, implement advantageous features as set forth below.

INTRODUCTION

The TTEIE provides unconventional features (e.g., searching for tactics and identifying found tactics via a user interface overlay over ticks) that were never before available in search engines.

In one embodiment, tactics are trading techniques that define how to place an order given stock market rules, order types, research, and analytics. These techniques change over time with innovation, and changes in market structure. Trading algorithms use these tactics and some tactics can vary from algorithm to algorithm, broker to broker. Some example characteristics of tactics may include: trigger condition, exchange or dark pool, timing, sizing, pricing, special order instructions. Some example tactics may include: hide at bid price in a dark pool, hide at midpoint price in an exchange, place a small order at bid price+1 and immediately cancel, place an order at the bid price showing only a small amount and when that small amount is traded refresh it from a reserve, loosely follow the bid price randomizing time, simultaneously ping all dark pools for liquidity at midpoint. Identifying tactics can be difficult, due to background noise from other trading activity, and because a trading tactic can appear in the market data in many slightly different ways.

In various embodiments, the TTEIE may facilitate searching through a noisy environment to identify fuzzy tactics while also ruling out false positives. Through this unique ability, the TTEIE may simultaneously monitor many securities (e.g., stocks, bonds) and digest qualitative information about what other buyers and sellers are doing in a security. The TTEIE may utilize a user interface overlay to identify found tactics in a price chart, a table of trades and quotes, and/or the like.

Although, as an illustrative example, the TTEIE may be utilized to identify tactics, the TTEIE is a search engine that may also be utilized for a variety of other uses, such as identifying constellations by scanning the sky from east to west.

In one embodiment, the TTEIE provides a mechanism allowing traders to make better decisions by scaling their ability to maintain awareness of trading activity in a stock. With the TTEIE, a trader can simultaneously maintain detailed monitoring of market activity on every order they trade.

In the stock market, often there is too much information for the institutional trader to digest. As a result, much of trading happens by computer algorithms without the institutional trader being aware or involved. Computer algorithms employ a set of trading styles/tactics, which can be detected on public market data. Identifying tactics can be difficult, due to background noise from other trading activity, and because a trading tactic can appear in the market data in many slightly different ways. The TTEIE can identify fuzzy tactics from a noisy environment while also ruling out false positives. Through this unique ability, the TTEIE can simultaneously monitor many stocks and digest qualitative information about what other buyers and sellers are doing in a stock.

The TTEIE can be used to provide a picture about what other buyers and sellers are doing with a stock, so that traders can make more informed decisions. It can notify a trader of opportunities, and risks. This brings a higher level of situational awareness to trading desks.

Existing systems do not get to the detailed level of identifying trading tactics. For example, existing systems do not collectively provide:
1. Broad marketplace participant behavioral detection.
2. Detects specific trading tactics.
3. Overlay of order and executions so a trader can see how they are represented in the marketplace.

In one embodiment, the TTEIE provides an engine designed to identify patterns based on relationships between data points. The engine facilitates identifying trading tactics. But the engine can also be applied to other uses, like identifying constellations by scanning the sky from East to West.

Identify patterns from time series data
    May be completely configurable
    Absolute and relative relationships
    Time, numeric, and categorical relationships
    Tolerance for behavior variability, like different stocks, randomization logic
    False positive filtering from noisy environments
    May track identified contacts until the activity stops In one embodiment, the TTEIE provides datastructure rules identifying a variety of trading tactics.

In one embodiment, the TTEIE provides a mechanism to piece this information together in a user interface, to provide the trader a picture of buying and selling activity in a stock.

In one embodiment, the TTEIE is applied to a traded symbol's current market data. The TTEIE may be applied to any asset class (e.g., Equity Common Stock).

In one embodiment, tactics are detected by filters on tick data (market trades and quotes). The user may define the tactics. The pattern filters may have the following properties:
    Time series
    Tolerant of noise
    Allows relative conditions that are comparisons to other data points in the pattern
    Allows absolute conditions on the current data point
    Allows combinations of relative and absolute conditions to determine a matching point
    Allows combinations of relative and absolute conditions to determine a reject point, a data point that is not allowable for the pattern to exist
    Minimum number of matching points
    Minimum signal to noise ratio For example, some of the tactics that the TTEIE may be configured to identify include: Flickering Bid, Pegged Bid, Fast Pegged Bid, Multi Bid Post, Synchronized Bid/Ask, Bid Iceberg, Fading Lone Bid, Skittish Bid, MM Price Improved Bid, Block, Hidden, Dark Peg Midpoint, Dark Peg Bid, Dark Spray.

The engine processes tick data to find tactics:
    For every new tick it hypothesizes it has made contact with every pattern.
    As more ticks arrive, hypotheses are either ruled out, or found to be probable.

In real-time, or historical, a trade or quote arrives. For each contact:
    Apply contact's reject rules on the time series to see if the contact is a false positive.
    Evaluate the contact's match rules on the time series.
    Mark the contact as identified if it has met sufficient signal to noise ratio.

The information about what other market participants are doing in a stock is presented in a user interface. The user interface may present information in a price chart, and a table of trades and quotes.

TTEIE

FIG. 1 shows an architecture for the TTEIE. In FIG. 1, an embodiment of a TTEIE architecture that may be utilized to identify tactics and show found tactics via a user interface overlay over ticks is illustrated. A tactic tracking and evaluation component 125 is a hypothesis manager that utilizes a tracking subcomponent and an evaluation subcomponent. The tracking subcomponent obtains ticks from a tick buffer component 115 and tactic definitions from a tactic definition component 120, and, for each tick, tries to assume that the tick is part of each tactic. The tracking subcomponent creates a new hypothesis for each new tick/tactic combination, and appends new ticks onto each existing tactic. The evaluation subcomponent determines, for each hypothesis, whether a tactic has been identified, whether the hypothesis should continue to be evaluated, or whether the hypothesis should be rejected. The evaluation subcomponent evaluates a hypothesis for matching ticks that would match a tactic, for reject ticks that would reject the hypothesis, for signal to noise ratio, and/or the like. See FIG. 3 for additional architectural details regarding the tactic tracking and evaluation component.

The tick buffer component may feed ticks into the tactic tracking and evaluation component one tick at a time. The tick buffer component facilitates handling spikes in tick data arrival. The tick buffer component may be utilized as an interface point for supplying real-time market data (e.g., for production purposes) or historical market data (e.g., for testing purposes) to the tactic tracking and evaluation component. Real-time market data may be provided by a real-time market data component 105. A tick merger component 110 may merge trades and quotes from real-time market data into ticks (e.g., utilizing one table) and may sequence ticks by time. The tick merger component may provide real-time ticks (e.g., combined trades and quotes) to the tactic tracking and evaluation component (e.g., via the tick buffer component). A historical market data component 101 may provide historical ticks to the tactic tracking and evaluation component (e.g., via the tick buffer component).

The tactic definition component may provide tactic definitions to the tracking and evaluation component. A tactic may be thought of as a "constellation" of ticks. Characteristics of individual ticks (e.g., numerical, categorical), how ticks relate to each other (e.g., quantity difference), timing between ticks, and/or the like may be utilized to define a tactic. See FIG. 2 for additional architectural details regarding tactic definitions.

Tactics identified by the tracking and evaluation component may be stored in an identified tactics repository 130. A user interface 135 may be notified regarding tactics added to the identified tactics repository and may be updated to show identified tactics. For example, a webpage that shows trades and quotes as one table, with tactics highlighted and labelled, may be utilized. See FIGS. 6-15 for additional examples of user interfaces that may be utilized.

FIG. 2 shows an architecture for the TTEIE. In FIG. 2, an embodiment of how a tactic definition may be implemented is illustrated. In one embodiment, a tactic may be identified by the time series pattern it leaves in the market data. In one implementation, a tactic definition for a tactic may identify a time series of match rules (e.g., signifying that a set of ticks may be part of the tactic) and/or a time series of reject rules (e.g., signifying that a set of ticks cannot be part of the tactic). Each condition (e.g., match rule or reject rule) may be defined by a combination of absolute conditions on a data point (e.g., tickType=Trade, exchange=DF, and Size=100), relative conditions on a data point (e.g., (ask−bid)>0), and relative conditions between data points in the time series (e.g., 100 ms>(quote 1 time−quote 2 time), and quote 1 price>quote 2 price). In one implementation, conditions may be defined relative to other (e.g., prior) conditions (e.g., as indicated by solid ticks), and ignore background noise ticks (e.g., as indicated by striped ticks) in between. In some implementations, a tactic definition for a tactic may identify a minimum length (e.g., a minimum number of matching ticks) for a tactic, a maximum length for a tactic, a minimum signal to noise ratio (e.g., matching ticks/all ticks (including the noise ticks)), and/or the like.

FIG. 3 shows an architecture for the TTEIE. In FIG. 3, an embodiment of how a tactic tracking and evaluation component may be utilized to identify tactics and show found tactics via a user interface is illustrated. A library of tactic definitions may be defined and stored by a tactic definition component. In one implementation, a tactic definition for a tactic may identify a time series of match conditions and/or reject conditions defined by absolute conditions and/or relative conditions. Each time a tick (e.g., a trade or quote) is passed from a tick buffer component, a new contact (e.g., a new hypothesis) is created for each tactic definition in the library and appended to a tracking list, and the tick is appended to tick data of each contact in the tracking list for evaluation.

The tactic tracking and evaluation component may iterate through contacts in the tracking list to evaluate each contact's time series of conditions with regard to the respective contact's tick data. In one implementation, a contact's match conditions and/or reject conditions may be executed against the contact's tick data. For example, this may involve applying a match positions filter to allow time series relationships amongst discontinuous match points (e.g., to facilitate matching with precision while also allowing background noise). In another example, this may involve copying matching ticks to another datastructure (e.g., to generate a separate array of matches) to allow time series relationships amongst discontinuous match points.

Each contact (e.g., each tactic N) may be classified as a hypothesis that should continue to be evaluated (e.g., the respective contact remains in the tracking list), classified as a hypothesis that should be rejected (e.g., the respective contact is removed from the tracking list), or classified as an identified tactic (e.g., the respective contact is stored in an identified tactics repository). In one implementation, identified tactic data for a contact stored in the identified tactics repository may include a tactic identifier, a set of matching ticks from the contact's tick data, an identification confidence metric (e.g., signal to noise ratio), and/or the like. A subscribing client may be notified when an identified tactic is added to the identified tactics repository, and the subscribing client's user interface may be updated to show the identified tactic (e.g., with the identified tactic highlighted in market data visualization widgets and/or labelled).

FIGS. 4A-B show a datagraph illustrating data flow(s) for the TTEIE. In FIGS. 4A-B, a client 402 (e.g., of a user) may send a subscription request 421 to a TTEIE server 404 to indicate that the client wishes to be notified when tactics are identified for a set of securities (e.g., stocks, bonds). For example, the client may be a desktop, a laptop, a tablet, a smartphone, a smartwatch, and/or the like that is executing a client application. In one implementation, the subscription request may include data such as a request identifier, a request type, a set of search targets (e.g., securities), and/or the like. In one embodiment, the client may provide the following example subscription request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertificate.dc</digital_cert_link>
            //OPTIONAL <digital_certificate>_DATA_</digital_certificate>
        </user_account_credentials>
    </user_accounts_details>
    <client_details> //iOS Client with App and Webkit
```

```
        //it should be noted that although several client details
        //sections are provided to show example variants of client
        //sources, further messages will include only on to save
        //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>TTEIE.app</app_name>
    <app_version>1.0 </app_version>
    <app_webkit_name>Mobile Safari</client_webkit_name>
    <client_version>537.51.2</client_version>
</client_details>
<client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<subscription_request>
    <request_identifier>ID_request_1</request_identifier>
    <request_type>SUBSCRIBE</request_type>
    <search_targets>NASDAQ:TEAM, NASDAQ:GOOG, NASDAQ:MSFT</search_targets>
</subscription_request>
</auth_request>
```

The TTEIE server may send a subscription response 425 to the client to confirm that the subscription request was processed successfully. In one implementation, the subscription response may include data such as a response identifier, a status, and/or the like. In one embodiment, the TTEIE server may provide the following example subscription response, substantially in the form of a HTTP(S) POST message including XML-formatted data, as provided below:

```
POST /subscription_response.php HTTP/1.1
Host: www.server.com
Content-Type: Application/XML
Content-Length: 667
<?XML version = "1.0" encoding = "UTF-8"?>
<subscription_response>
    <response_identifier>ID_response_1</response_identifier>
```

```
<status>OK</status>
</subscription_response>
```

A tactic tracking, evaluation and identification (TTEI) component 429 may identify tactics in ticks by analyzing contacts and/or may notify the client when a tactic is identified for a search target subscribed to by the client. See FIG. 5 for additional details regarding the TTEI component.

The TTEIE server may send a tactics retrieve request 433 to a tactics repository 406 to retrieve a set of predefined tactic definition datastructures. In one implementation, the tactics retrieve request may include data such as a request identifier, a request type, a specification of tactic definition datastructures to retrieve (e.g., all, a specified subset), and/or the like. In one embodiment, the TTEIE server may provide the following example tactics retrieve request, substantially in the form of a HTTP(S) POST message including XML-formatted data, as provided below:

```
POST /tactics_retrieve_request.php HTTP/1.1
Host: www.server.com
Content-Type: Application/XML
Content-Length: 667
<?XML version = "1.0" encoding = "UTF-8"?>
<tactics_retrieve_request>
    <request_identifier>ID_request_2</request_identifier>
    <request_type>RETRIEVE_TACTIC_DEFINITION_DATASTRUCTURES</request_type>
    <desired_tactic_definitions>ALL</desired_tactic_definitions>
</tactics_retrieve_request>
```

The tactics repository may send a tactics retrieve response 437 to the TTEIE server with the requested tactic definition datastructures. In one implementation, the tactics retrieve response may include data such as a response identifier, the requested tactic definition datastructures, and/or the like. In one embodiment, the tactics repository may provide the following example tactics retrieve response, substantially in the form of a HTTP(S) POST message including XML-formatted data, as provided below:

```
POST /tactics_retrieve_response.php HTTP/1.1
Host: www.server.com
Content-Type: Application/XML
Content-Length: 667
<?XML version = "1.0" encoding = "UTF-8"?>
<tactics_retrieve_response>
    <response_identifier>ID_response_2</response_identifier>
    <tactic_definitions>
        <tactic_definition>
            <tactic_identifier>ID_tactic_1</tactic_identifier>
            <tactic_name>Flickering Bid</tactic_name>
            <min_length>10 ticks</min_length>
            <max_length>200 ticks</max_length>
            <min_signal_to_noise_ratio>70%</min_signal_to_noise_ratio>
            <conditions>
                <condition>
                    <time_sequence>0</time_sequence>
                    <rule_type>MATCH_RULE</rule_type>
                    <rule_details>type=quote</rule_details>
                </condition>
                <condition>
                    <time_sequence>1</time_sequence>
                    <rule_type>MATCH_RULE</rule_type>
                    <rule_details>(bid_{t1}>bid_{t0}) AND (time_{t1}-time_{t0}) >9ms</rule_details>
                </condition>
                <condition>
                    <time_sequence>2</time_sequence>
                    <rule_type>REJECT_RULE</rule_type>
                    <rule_details>(bid_{t2}<bid_{t0})</rule_details>
                </condition>
                <condition>
                    <time_sequence>2</time_sequence>
                    <rule_type>REJECT_RULE</rule_type>
                    <rule_details>(ask_{t2}<ask_{t0})</rule_details>
                </condition>
                ...
            <conditions>
        </tactic_definition>
        <tactic_definition>
            <tactic_identifier>ID_tactic_2</tactic_identi-Fier>
            <tactic_name>Pegged Bid</tactic_name>
            ...
```

```
    </tactic_definition>
    ...
  </tactic_definitions>
</tactics_retrieve_response>
```

A tick buffer server 408 may send a tick notification request 441 to the TTEIE server to provide tick data (e.g., combined trades and quotes) to the TTEIE server. In one implementation, the tick notification request may include data such as a request identifier, a tick identifier, a target identifier, a tick type, tick details, and/or the like. In one embodiment, the tick buffer server may provide the following example tick notification request (e.g., for a trade—T), substantially in the form of a HTTP(S) POST message including XML-formatted data, as provided below:

```
POST /tick_notification_request.php HTTP/1.1
Host: www.server.com
Content-Type: Application/XML
Content-Length: 667
<?XML version = "1.0" encoding = "UTF-8"?>
<tick_notification_request>
    <request_identifier>ID_request_3</request_identifier>
    <tick>
        <tick_identifier>ID_tick_1</tick_identifier>
        <target>NASDAQ:TEAM</target>
        <tick_type>T</tick_type>
        <tick_details>
            <time>09:46:02</time>
            <exchange>DF</exchange>
            <qualifier>Normal:OddLot</qualifier>
            <size>1</size>
            <price>94.35</price>
        </tick_details>
    </tick>
</tick_notification_request>
```

In another embodiment, the tick buffer server may provide the following example tick notification request (e.g., for a quote—Q), substantially in the form of a HTTP(S) POST message including XML-formatted data, as provided below:

```
POST /tick_notification_request.php HTTP/1.1
Host: www.server.com
Content-Type: Application/XML
Content-Length: 667
<?XML version = "1.0" encoding = "UTF-8"?>
<tick_notification_request>
    <request_identifier>ID_request_3</request_identifier>
    <tick>
        <tick_identifier>ID_tick_2</tick_identifier>
```

-continued

```
        <target>NASDAQ:TEAM</target>
        <tick_type>Q</tick_type>
        <tick_details>
            <time>09:46:28</time>
            <bid>94.28</bid>
            <bid_size>100</bid_size>
            <ask>94.47</ask>
            <ask_size>300</ask_size>
        </tick_details>
    </tick>
</tick_notification_request>
```

The TTEIE server may send a tick notification response 445 to the tick buffer server to confirm that the tick notification request was processed successfully. In one implementation, the tick notification response may include data such as a response identifier, a status, and/or the like. In one embodiment, the TTEIE server may provide the following example tick notification response, substantially in the form of a HTTP(S) POST message including XML-formatted data, as provided below:

```
POST /tick_notification_response.php HTTP/1.1
Host: www.server.com
Content-Type: Application/XML
Content-Length: 667
<?XML version = "1.0" encoding = "UTF-8"?>
<tick_notification_response>
    <response_identifier>ID_response_3</response_identifier>
    <status>OK</status>
</tick_notification_response>
```

The TTEIE server may send an identified tactic store request 449 to an identification repository 410 to facilitate storing identified tactic data for a contact classified as an identified tactic. In one implementation, the identified tactic store request may include data such as a request identifier, a request type, a contact identifier, a target identifier, a tactic category, a tactic identifier, a set of matching tick identifiers, an identification confidence metric (e.g., signal to noise ratio), and/or the like. In one embodiment, the TTEIE server may provide the following example identified tactic store request, substantially in the form of a HTTP(S) POST message including XML-formatted data, as provided below:

```
POST /identified_tactic_store_request.php HTTP/1.1
Host: www.server.com
Content-Type: Application/XML
Content-Length: 667
<?XML version = "1.0" encoding = "UTF-8"?>
<identified_tactic_store_request>
    <request_identifier>ID_request_4</request_identifier>
    <request_type>STORE_IDENTIFIED_TACTIC</request_type>
    <contact_identifier>ID_contact_1</contact_identifier>
    <target>NASDAQ:TEAM</target>
    <tactic_category>ImprovingBuy</tactic_category>
    <tactic_identifier>FlickeringBid</tactic_identifier>
    <matching_ticks>ID_tick_2, ID_tick_3, ID_tick_5, ID_tick_6</matching_ticks>
    <identification_confidence>90%</identification_confidence>
</identified_tactic_store_request>
```

The identification repository may send an identified tactic store response 453 to the TTEIE server to confirm that the identified tactic data for the contact was stored successfully. In one implementation, the identified tactic store response may include data such as a response identifier, a status, and/or the like. In one embodiment, the identification repository may provide the following example identified tactic store response, substantially in the form of a HTTP(S) POST message including XML-formatted data, as provided below:

```
POST /identified_tactic_store_response.php HTTP/1.1
Host: www.server.com
Content-Type: Application/XML
Content-Length: 667
<?XML version = "1.0" encoding = "UTF-8"?>
<identified_tactic_store_response>
    <response_identifier>ID_response_4</response_identifier>
    <status>OK</status>
</identified_tactic_store_response>
```

The TTEIE server may send a user interface update notification 457 to the client to notify the client that a tactic was identified for a subscribed search target. In one implementation, the user interface update notification may include data such as a request identifier, a request type, a search target identifier, a contact identifier, and/or the like. In one embodiment, the TTEIE server may provide the following example user interface update notification, substantially in the form of a HTTP(S) POST message including XML-formatted data, as provided below:

```
POST /user_interface_update_notification.php HTTP/1.1
Host: www.server.com
Content-Type: Application/XML
Content-Length: 667
<?XML version = "1.0" encoding = "UTF-8"?>
<user_interface_update_notification>
    <request_identifier>ID_request_5</request_identifier>
    <request_type>TACTIC_IDENTIFIED_NOTIFICATION</request_type>
    <search_target>NASDAQ:TEAM</search_target>
    <contact_identifier>ID_contact_1</contact_identifier>
</user_interface_update_notification>
```

The client may send an identified tactic retrieve request 461 to the identification repository to facilitate retrieving identified tactic data for the subscribed search target (e.g., to facilitate updating the client's user interface to show the identified tactic for the subscribed search target). In one implementation, the identified tactic retrieve request may include data such as a request identifier, a request type, a contact identifier, and/or the like. In one embodiment, the client may provide the following example identified tactic retrieve request, substantially in the form of a HTTP(S) POST message including XML-formatted data, as provided below:

```
POST /identified_tactic_retrieve_request.php HTTP/1.1
Host: www.server.com
Content-Type: Application/XML
Content-Length: 667
<?XML version = "1.0" encoding = "UTF-8"?>
<identified_tactic_retrieve_request>
    <request_identifier>ID_request_6</request_identifier>
    <request_type>RETRIEVE_IDENTIFIED_TACTIC</request_type>
    <contact_identifier>ID_contact_1</contact_identifier>
</identified_tactic_retrieve_request>
```

The identification repository may send an identified tactic retrieve response 465 to the client with the requested identified tactic data. In one implementation, the identified tactic retrieve response may include data such as a response identifier, the requested identified tactic data, and/or the like. In one embodiment, the identification repository may provide the following example identified tactic retrieve response, substantially in the form of a HTTP(S) POST message including XML-formatted data, as provided below:

```
POST /identified_tactic_retrieve_response.php HTTP/1.1
Host: www.server.com
Content-Type: Application/XML
Content-Length: 667
```

-continued

```
<?XML version = "1.0" encoding = "UTF-8"?>
<identified_tactic_retrieve_response>
    <response_identifier>ID_response_6</response_identifier>
    <target>NASDAQ:TEAM</target>
    <tactic_category>ImprovingBuy</tactic_category>
    <tactic_identifier>FlickeringBid</tactic_identifier>
    <matching_ticks>ID_tick_2, ID_tick_3, ID_tick_5, ID_tick_6</matching_ticks>
    <identification_confidence>90%</identification_confidence>
</identified_tactic_retrieve_response>
```

FIG. 5 shows a logic flow illustrating embodiments of a tactic tracking, evaluation and identification (TTEI) component for the TTEIE. In FIG. 5, a subscription request from a client may be obtained at 501. For example, the subscription request may be obtained as a result of the client subscribing to be notified when tactics are identified for a subscribed set of securities.

A set of tactic definition datastructures may be retrieved at 505. For example, a tactic definition datastructure may identify a time series of rules that define a tactic. In one implementation, the set of tactic definition datastructures may be retrieved via a tactics retrieve request. For example, the set of tactic definition datastructures may be retrieved via a MySQL database command similar to the following:

```
SELECT *
FROM TacticDefinitions
WHERE tacticIsActive = TRUE;
```

A determination may be made at 509 whether a tick notification for a security was obtained (e.g., from a tick buffer server). If a tick notification was not obtained, the TTEI component may wait at 513 until a tick notification is obtained.

If a tick notification was obtained, a contact may be added to a tracking list of contacts for the security for each retrieved tactic definition data structure at 517. For example, each contact may be a hypothesis that the contact's time series of ticks matches the time series of rules associated with the tactic definition datastructure corresponding to the contact. Initially, a contact may be created with an empty time series of ticks. In one implementation, the tracking list of contacts may be an array, a linked list, and/or the like of contact datastructures. For example, a contact datastructure may be defined similar to the following:
Contact Datastructure
Contact Identifier—identifier of the contact
Target Identifier—identifier of a security associated with the contact
Tactic Identifier—identifier of the corresponding tactic definition datastructure
Time Series of Ticks—a set of ticks associated with the contact
Match Positions Filter—a filter that specifies which ticks, in the time series of ticks, match conditions of the corresponding tactic definition datastructure A determination may be made at 521 whether there remain contacts to analyze. In one implementation, each of the contacts in the tracking list of contacts may be analyzed. If there remain contacts to analyze, the next contact may be selected at 525.

The tick associated with the obtained tick notification may be appended to the selected contact's time series of ticks at 529. For example, the tick may include trades and/or quotes data for the security associated with the selected contact. In one implementation, the selected contact's time series of ticks may be an array, a linked list, and/or the like of tick datastructures.

A match filter may be applied to the selected contact's time series of ticks at 531. For example, the match filter may specify which of the ticks, in the selected contact's time series of ticks, satisfied previously applied match rules and/or reject rules from the corresponding tactic definition datastructure. In one implementation, an array, a bitmask, and/or the like may be utilized to filter out background noise ticks and/or select matching ticks utilized to evaluate the next rule from the corresponding tactic definition datastructure. For example, if ticks 352 and 360 are matches, and the TTEI component is evaluating tick 367 to determine whether it is a match, the next rule may be that the bid from the match 2 positions ago had to be a penny lower than the current tick's bid and the bid from the match 1 position ago had to be a penny higher and within 100 milliseconds of the current tick. The match filter may be utilized to select the match 2 positions ago (e.g., tick 352) and the match 1 position ago (e.g., tick 360), and to evaluate the rule in the form of (bid[T−2]+0.01)=bid[T]) AND (bid[T−1]−0.01=bid[T]) AND (time[T−1]>time[T]−00:00:00.100) while skipping the background noise ticks in between (e.g., ticks 353-359 and 361-366). In another implementation, matching ticks may be copied (e.g., when determined to match) to a separate array, linked list, and/or the like of tick datastructures, and the datastructure containing the matching ticks may be utilized to evaluate the next rule from the corresponding tactic definition datastructure.

The selected contact's time series of ticks may be evaluated against reject rules at 533. For example, satisfying a reject rule may signify that the selected contact's time series of ticks cannot be part of the tactic associated with the corresponding tactic definition datastructure (e.g., the hypothesis is rejected). In one embodiment, if the next set of rules from the corresponding tactic definition datastructure includes one or more reject rules, the one or more reject rules may be tested. In one implementation, each condition corresponding to the current time sequence (e.g., as determined based on the number of previously matched conditions) that is a reject rule (e.g., time_sequence=2 AND rule_type=REJECT_RULE) may be tested (e.g., based on a rule specified in the rule_details field).

The selected contact's time series of ticks may be evaluated against match rules at 537. For example, satisfying a match rule may signify that there is an additional match in the selected contact's time series of ticks with regard to the tactic associated with the corresponding tactic definition datastructure. In one embodiment, if the next set of rules from the corresponding tactic definition datastructure includes one or more match rules, the one or more match rules may be tested. In one implementation, each condition corresponding to the current time sequence (e.g., as determined based on the number of previously matched conditions) that is a match rule (e.g., time_sequence=1 AND rule_type=MATCH_RULE) may be tested (e.g., based on a rule specified in the rule_details field).

The selected contact's time series of ticks may be evaluated against minimum length at 541. For example, the minimum length may specify a minimum number of matching ticks (e.g., 10 matching ticks) that should be found before the tactic associated with the corresponding tactic definition datastructure may be considered to be identified (e.g., the hypothesis is accepted). In one implementation, the number of matches (e.g., as determined based on the match filter or the matching ticks datastructure) may be ascertained and compared against the minimum length (e.g., based on the value of the min_length field) for the tactic to determine whether the minimum length is met.

The selected contact's time series of ticks may be evaluated against maximum length at 545. For example, the maximum length may specify a maximum number of ticks (e.g., 200 ticks) that may occur before the selected contact's time series of ticks cannot be part of the tactic associated with the corresponding tactic definition datastructure (e.g., the hypothesis is rejected). In one implementation, the number of ticks in the selected contact's time series of ticks may be ascertained and compared against the maximum length (e.g., based on the value of the max_length field) for the tactic to determine whether the maximum length is exceeded.

The selected contact's signal to noise ratio may be determined at 549. For example, the signal to noise ratio may be a ratio of matching ticks to all ticks in the selected contact's time series of ticks. In one implementation, the signal to noise ratio of the selected contact's time series of ticks may be ascertained and compared against the minimum signal to noise ratio (e.g., based on the value of the min_signal_to_noise_ratio field) for the tactic to determine whether the minimum signal to noise ratio is met (e.g., if the minimum signal to noise ratio is not met the hypothesis may not be accepted).

The selected contact may be classified at 551. In one embodiment, the selected contact may be classified as rejected. For example, if the selected contact satisfies a reject rule or exceeds the maximum length, the selected contact may be classified as rejected. In another embodiment, the selected contact may be classified as accepted (e.g., identified as a tactic). For example, if the selected contact meets the minimum length and the minimum signal to noise ratio, the selected contact may be classified as accepted. In another embodiment, the selected contact may be classified as a hypothesis to continue tracking. For example, if there is not enough data to classify the selected contact as accepted or rejected, the selected contact may be classified as a hypothesis to continue tracking.

A determination may be made at 553 regarding how the selected contact was classified. If the selected contact was classified as accepted (e.g., identified as a tactic), an identified tactic datastructure for the selected contact may be stored at 557. In one implementation, the identified tactic datastructure for the selected contact may be stored via an identified tactic store request. If the selected contact was classified as accepted or rejected the selected contact may be removed from the tracking list of contacts for the security at 561.

If there do not remain contacts to analyze, a determination may be made at 565 whether one or more identified tactics were found. If one or more identified tactics were found, a determination may be made at 569 whether the identified tactics are associated with a security specified in the subscribed set of securities for the client. If so, the client may be notified to update the client's user interface (e.g., to show the one or more newly identified tactics for the security) at 573. In one implementation, the client may be notified via a user interface update notification.

FIGS. 6-15 show screenshots illustrating user interface(s) of the TTEIE. In FIGS. 6-15, exemplary user interfaces (e.g., for a website) for showing identified tactics (e.g., via one or more user interface overalys over a table of trades and quotes and/or over a price chart) are illustrated. In some implementations, identified tactics may be labeled with names (e.g., shown in the tactics column) and/or categories (e.g., shown in the tactical category column). In some implementations, identified tactics may be highlighted using different colors. In some implementations, identified tactics may be flagged in a price chart. In some implementations, a table of trades and quotes may be filtered to show those ticks that are associated with identified tactics.

TTEIE Controller

FIG. 16 shows a block diagram illustrating embodiments of a TTEIE controller. In this embodiment, the TTEIE controller 1601 may serve to aggregate, process, store, search, serve, identify, instruct, generate, match, and/or facilitate interactions with a computer through search engines technologies, and/or other related data.

Users, which may be people and/or other systems, may engage information technology systems (e.g., computers) to facilitate information processing. In turn, computers employ processors to process information; such processors 1603 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the TTEIE controller 1601 may be connected to and/or communicate with entities such as, but not limited to: one or more users from peripheral devices 1612 (e.g., user input devices 1611); an optional cryptographic processor device 1628; and/or a communications network 1613.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The TTEIE controller 1601 may be based on computer systems that may comprise, but are not limited to, components such as: a computer systemization 1602 connected to memory 1629.

Computer Systemization

A computer systemization 1602 may comprise a clock 1630, central processing unit ("CPU(s)" and/or "processor(s)" (these terms are used interchangeably throughout the disclosure unless noted to the contrary)) 1603, a memory 1629 (e.g., a read only memory (ROM) 1606, a random access memory (RAM) 1605, etc.), and/or an interface bus 1607, and most frequently, although not necessarily, are all interconnected and/or communicating through a system bus 1604 on one or more (mother)board(s) 1602 having conductive and/or otherwise transportive circuit pathways through which instructions (e.g., binary encoded signals) may travel to effectuate communications, operations, storage, etc. The computer systemization may be connected to a power source 1686; e.g., optionally the power source may be internal. Optionally, a cryptographic processor 1626 may be connected to the system bus. In another embodiment, the cryptographic processor, transceivers (e.g., ICs) 1674, and/or sensor array (e.g., accelerometer, altimeter, ambient light, barometer, global positioning system (GPS) (thereby allowing TTEIE controller to determine its location), gyroscope, magnetometer, pedometer, proximity, ultra-violet sensor, etc.) 1673 may be connected as either internal and/or external peripheral devices 1612 via the interface bus I/O 1608 (not pictured) and/or directly via the interface bus 1607. In turn, the transceivers may be connected to antenna(s) 1675, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's Dragon-Ball® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the TTEIE controller and beyond through various interfaces. Should processing requirements dictate a greater amount speed and/or capacity, distributed processors (e.g., see Distributed TTEIE below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the TTEIE may be achieved by implementing a microcontroller such as CAST's® R8051XC2 microcontroller; Intel's® MCS 51 (i.e., 8051 microcontroller); and/or the like. Also, to implement certain features of the TTEIE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the TTEIE component collection (distributed or otherwise) and/or features may be implemented via the microprocessor and/or via embedded components; e.g., via ASIC, coprocessor, DSP, FPGA, and/or the like. Alternately, some implementations of the TTEIE may be implemented with embedded components that are configured and used to achieve a variety of features or signal processing.

Depending on the particular implementation, the embedded components may include software solutions, hardware solutions, and/or some combination of both hardware/software solutions. For example, TTEIE features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the TTEIE features. A hierarchy of programmable interconnects allow logic blocks to be interconnected as needed by the TTEIE system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the TTEIE may be developed on FPGAs and then migrated into a fixed version that more resembles ASIC implementations. Alternate or coordinating implementations may migrate TTEIE controller features to a final ASIC instead of or in addition to FPGAs. Depending on the implementation all of the aforementioned embedded components and microprocessors may be considered the "CPU" and/or "processor" for the TTEIE.

Power Source

The power source 1686 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the TTEIE thereby providing an electric current to all subsequent components. In one example, the power source 1686 is connected to the system bus component 1604. In an alternative embodiment, an outside power source 1686 is provided through a connection across the I/O 1608 interface. For example, a USB and/or IEEE 1394 connection carries both data and power across the connection and is therefore a suitable source of power.

Interface Adapters

Interface bus(ses) 1607 may accept, connect, and/or communicate to a number of interface adapters, variously although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 1613, the TTEIE controller is accessible through remote clients 1633b (e.g., computers with web browsers) by users 1633a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed TTEIE below), architectures may similarly be employed to pool, load balance, and/or otherwise decrease/increase the communicative bandwidth required by the TTEIE controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user, peripheral devices 1612 (e.g., input devices 1611), cryptographic processor devices 1628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1612 may be connected and/or communicate to I/O and/or other facilities of the like such as network interfaces, storage interfaces, directly to the interface bus, system bus, the CPU, and/or the like. Peripheral devices may be external, internal and/or part of the TTEIE controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the TTEIE controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the TTEIE controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the TTEIE controller and/or a computer systemization may employ various forms of memory 1629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1629 will include ROM 1606, RAM 1605, and a storage device 1614. A storage device 1614 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1629 may contain a collection of program and/or database components and/or data such as, but not limited to: operating system component(s) 1615 (operating system); information server component(s) 1616 (information server); user interface component(s) 1617 (user interface); Web browser component(s) 1618 (Web browser); database(s) 1619; mail server component(s) 1621; mail client component(s) 1622; cryptographic server component(s) 1620 (cryptographic server); the TTEIE component(s) 1635; and/or the like (i.e., collectively a component collection). These components may be stored and accessed from the storage devices and/or from storage devices accessible through an interface bus. Although unconventional program components such as those in the component collection may be stored in a local storage device 1614, they may also be loaded and/or stored in memory such as: peripheral devices, RAM, remote storage facilities through a communications network, ROM, various forms of memory, and/or the like.

Operating System

The operating system component 1615 is an executable program component facilitating the operation of the TTEIE controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the TTEIE controller to communicate with other entities through a communications network 1613. Various communication protocols may be used by the TTEIE controller as a subcarrier transport mechanism for interaction, such as, but not limited to: multicast, TCP/IP, UDP, unicast, and/or the like.

Information Server

An information server component 1616 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the TTEIE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the TTEIE database 1619, operating systems, other program components, user interfaces, Web browsers, and/or the like.

Access to the TTEIE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TTEIE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the TTEIE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1617 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1618 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the TTEIE enabled nodes. The combined application may be nugatory on systems employing Web browsers.

Mail Server

A mail server component 1621 is a stored program component that is executed by a CPU 1603. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the TTEIE. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the TTEIE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1622 is a stored program component that is executed by a CPU 1603. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the TTEIE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the TTEIE component to engage in secure transactions if so desired. The cryptographic component facilitates the secure accessing of resources on the TTEIE and facilitates the access of secured resources on remote systems; i.e., it may act as a client/server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The TTEIE Database

The TTEIE database component 1619 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the TTEIE database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the TTEIE database is implemented as a data-structure, the use of the TTEIE database 1619 may be integrated into another component such as the TTEIE component 1635. Also, the database may be implemented as a mix of data structures, objects, and relational structures. Databases may be consolidated and/or distributed in countless variations (e.g., see Distributed TTEIE below). Portions of databases, e.g., tables, may be exported and/or imported and thus decentralized and/or integrated.

In one embodiment, the database component 1619 includes several tables 1619a-z:

An accounts table 1619a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1619b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a TTEIE);

An devices table 1619c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1619d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1619e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1619f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1619g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1619h includes fields such as, but not limited to: merchantID, merchantTaxID, merchanteName, merchantContactUserID, accountID, is suerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1619i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A TacticDefinitions table 1619j includes fields such as, but not limited to: tacticID, tacticName, tacticCategory, tacticConditions, tactMinLength, tacticMaxLength, tacticIsActive, and/or the like;

An IdentifiedTactics table 1619k includes fields such as, but not limited to: identifiedTacticID, identifiedTacticContactID, identifiedTacticTarget, identifiedTacticAssociatedTacticDefinitionID, identifiedTacticCategory, identifiedTacticMatchingTicks, identifiedTacticIdentificationConfidence, and/or the like;

A market_data table 1619z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the TTEIE database may interact with other database systems. For example, employing a distributed database system, queries and data access by search TTEIE component may treat the combination of the TTEIE database, an integrated data security layer database as a single database entity (e.g., see Distributed TTEIE below).

In one embodiment, user programs may contain various user interface primitives, which may serve to update the TTEIE. Also, various accounts may require custom database tables depending upon the environments and the types of clients the TTEIE may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1619*a-z*. The TTEIE may be configured to keep track of various settings, inputs, and parameters via database controllers.

The TTEIE database may communicate to and/or with other components in a component collection, including itself, and/or facilities of the like. Most frequently, the TTEIE database communicates with the TTEIE component, other program components, and/or the like. The database may contain, retain, and provide information regarding other nodes and data.

The TTEIEs

The TTEIE component 1635 is a stored program component that is executed by a CPU. In one embodiment, the TTEIE component incorporates any and/or all combinations of the aspects of the TTEIE that was discussed in the previous figures. As such, the TTEIE affects accessing, obtaining and the provision of information, services, transactions, and/or the like across various communications networks. The features and embodiments of the TTEIE discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the TTEIE's features and facilities, and in many cases reduce the costs, energy consumption/requirements, and extend the life of TTEIE's underlying infrastructure; this has the added benefit of making the TTEIE more reliable. Similarly, many of the features and mechanisms are designed to be easier for users to use and access, thereby broadening the audience that may enjoy/employ and exploit the feature sets of the TTEIE; such ease of use also helps to increase the reliability of the TTEIE. In addition, the feature sets include heightened security as noted via the Cryptographic components 1620, 1626, 1628 and throughout, making access to the features and data more reliable and secure The TTEIE transforms subscription request, tick notification request inputs, via TTEIE components (e.g., TTEI), into subscription response, identified tactic store request, user interface update notification outputs.

The TTEIE component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the TTEIE server employs a cryptographic server to encrypt and decrypt communications. The TTEIE component may communicate to and/or with other components in a component collection, including itself, and/or facilities of the like. Most frequently, the TTEIE component communicates with the TTEIE database, operating systems, other program components, and/or the like. The TTEIE may contain, communicate, generate, obtain, and/or provide program component, system, user, and/or data communications, requests, and/or responses.

Distributed TTEIEs

The structure and/or operation of any of the TTEIE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the TTEIE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for TTEIE controller and/or TTEIE component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the TTEIE controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference. Additional embodiments may include:

1. A tactic identification search engine apparatus, comprising:
   a memory;
   a component collection in the memory, including:
      a tactic tracking, evaluation and identification component;
   a processor disposed in communication with the memory, and configured to issue a plurality of processing instructions from the component collection stored in the memory,
      wherein the processor issues instructions from the tactic tracking, evaluation and identification component, stored in the memory, to:
         obtain, via at least one processor, a subscription request datastructure from a client, wherein the subscription request datastructure specifies a set of search targets;
         retrieve, via at least one processor, a set of tactic definition datastructures, wherein each tactic definition datastructure specifies a time series of rules that define a tactic;
         obtain, via at least one processor, a tick notification comprising tick data for a tick associated with a target;
         add, via at least one processor, a contact datastructure corresponding to each retrieved tactic definition datastructure to a tracking list of contact datastructures for the target, wherein each contact datastructure specifies a time series of ticks;
         append, via at least one processor, the tick data for the tick to a contact datastructure's time series of ticks, for each contact datastructure in the tracking list of contact datastructures for the target;
         evaluate, via at least one processor, a contact datastructure's time series of ticks with regard to the respective contact datastructure's corresponding time series of rules to classify the respective contact datastructure, for each contact datastructure in the tracking list of contact datastructures for the target;
         determine, via at least one processor, a set of identified tactic contact datastructures, from the evaluated contact datastructures, wherein each contact datastructure in the set of identified tactic contact datastructures is classified as an identified tactic;
         determine, via at least one processor, that the target corresponds to a search target specified in the set of search targets; and
         notify, via at least one processor, the client regarding the set of identified tactic contact datastructures.

2. The apparatus of embodiment 1, wherein a search target is a security identifier.

3. The apparatus of embodiment 1, wherein a tactic definition datastructure further specifies a minimum length, a maximum length, and a minimum signal to noise ratio.

4. The apparatus of embodiment 1, wherein a rule in a time series of rules that define a tactic is associated with a time sequence.

5. The apparatus of embodiment 1, wherein a rule in a time series of rules that define a tactic is defined relative to previously matched ticks.

6. The apparatus of embodiment 1, wherein the tick data for the tick comprises trades data or quotes data for the target.

7. The apparatus of embodiment 1, wherein a contact datastructure further comprises a match positions filter.

8. The apparatus of embodiment 1, wherein a contact datastructure further comprises a datastructure containing copies of matching ticks.

9. The apparatus of embodiment 1, further, comprising:
   the processor issues instructions from the tactic tracking, evaluation and identification component, stored in the memory, to:
      apply, via at least one processor, a match positions filter to a contact datastructure's time series of ticks to determine ticks in the contact datastructure's time series of ticks that satisfied previously applied rules from the contact datastructure's corresponding time series of rules.

10. The apparatus of embodiment 1, wherein the instructions to evaluate a contact datastructure's time series of ticks with regard to the respective contact datastructure's corresponding time series of rules further comprise instructions to evaluate the respective contact datastructure's time series of ticks with regard to a reject rule.

11. The apparatus of embodiment 1, wherein the instructions to evaluate a contact datastructure's time series of ticks with regard to the respective contact datastructure's corresponding time series of rules further comprise instructions to evaluate the respective contact datastructure's time series of ticks with regard to a match rule.

12. The apparatus of embodiment 1, further, comprising:
   the processor issues instructions from the tactic tracking, evaluation and identification component, stored in the memory, to:
      evaluate, via at least one processor, a contact datastructure's time series of ticks with regard to a minimum length.

13. The apparatus of embodiment 1, further, comprising:
   the processor issues instructions from the tactic tracking, evaluation and identification component, stored in the memory, to:
      evaluate, via at least one processor, a contact datastructure's time series of ticks with regard to a maximum length.

14. The apparatus of embodiment 1, further, comprising:
   the processor issues instructions from the tactic tracking, evaluation and identification component, stored in the memory, to:
      evaluate, via at least one processor, a contact datastructure with regard to a minimum signal to noise ratio.

15. The apparatus of embodiment 14, wherein a signal to noise ratio for the contact datastructure is defined as a ratio of matching ticks to all ticks in the contact datastructure's time series of ticks.

16. A processor-readable tactic identification search engine non-transient physical medium storing processor-executable components, the components, comprising:

a component collection stored in the medium, including:
  a tactic tracking, evaluation and identification component;
  wherein the tactic tracking, evaluation and identification component, stored in the medium, includes processor-issuable instructions to:
    obtain, via at least one processor, a subscription request datastructure from a client, wherein the subscription request datastructure specifies a set of search targets;
    retrieve, via at least one processor, a set of tactic definition datastructures, wherein each tactic definition datastructure specifies a time series of rules that define a tactic; obtain, via at least one processor, a tick notification comprising tick data for a tick associated with a target;
    add, via at least one processor, a contact datastructure corresponding to each retrieved tactic definition datastructure to a tracking list of contact datastructures for the target, wherein each contact datastructure specifies a time series of ticks;
    append, via at least one processor, the tick data for the tick to a contact datastructure's time series of ticks, for each contact datastructure in the tracking list of contact datastructures for the target;
    evaluate, via at least one processor, a contact datastructure's time series of ticks with regard to the respective contact datastructure's corresponding time series of rules to classify the respective contact datastructure, for each contact datastructure in the tracking list of contact datastructures for the target;
    determine, via at least one processor, a set of identified tactic contact datastructures, from the evaluated contact datastructures, wherein each contact datastructure in the set of identified tactic contact datastructures is classified as an identified tactic;
    determine, via at least one processor, that the target corresponds to a search target specified in the set of search targets; and
    notify, via at least one processor, the client regarding the set of identified tactic contact datastructures.

17. The medium of embodiment 16, wherein a search target is a security identifier.

18. The medium of embodiment 16, wherein a tactic definition datastructure further specifies a minimum length, a maximum length, and a minimum signal to noise ratio.

19. The medium of embodiment 16, wherein a rule in a time series of rules that define a tactic is associated with a time sequence.

20. The medium of embodiment 16, wherein a rule in a time series of rules that define a tactic is defined relative to previously matched ticks.

21. The medium of embodiment 16, wherein the tick data for the tick comprises trades data or quotes data for the target.

22. The medium of embodiment 16, wherein a contact datastructure further comprises a match positions filter.

23. The medium of embodiment 16, wherein a contact datastructure further comprises a datastructure containing copies of matching ticks.

24. The medium of embodiment 16, further, comprising:
  the tactic tracking, evaluation and identification component, stored in the medium, includes processor-issuable instructions to:
    apply, via at least one processor, a match positions filter to a contact datastructure's time series of ticks to determine ticks in the contact datastructure's time series of ticks that satisfied previously applied rules from the contact datastructure's corresponding time series of rules.

25. The medium of embodiment 16, wherein the instructions to evaluate a contact datastructure's time series of ticks with regard to the respective contact datastructure's corresponding time series of rules further comprise instructions to evaluate the respective contact datastructure's time series of ticks with regard to a reject rule.

26. The medium of embodiment 16, wherein the instructions to evaluate a contact datastructure's time series of ticks with regard to the respective contact datastructure's corresponding time series of rules further comprise instructions to evaluate the respective contact datastructure's time series of ticks with regard to a match rule.

27. The medium of embodiment 16, further, comprising:
  the tactic tracking, evaluation and identification component, stored in the medium, includes processor-issuable instructions to:
    evaluate, via at least one processor, a contact datastructure's time series of ticks with regard to a minimum length.

28. The medium of embodiment 16, further, comprising:
  the tactic tracking, evaluation and identification component, stored in the medium, includes processor-issuable instructions to:
    evaluate, via at least one processor, a contact datastructure's time series of ticks with regard to a maximum length.

29. The medium of embodiment 16, further, comprising:
  the tactic tracking, evaluation and identification component, stored in the medium, includes processor-issuable instructions to:
    evaluate, via at least one processor, a contact datastructure with regard to a minimum signal to noise ratio.

30. The medium of embodiment 29, wherein a signal to noise ratio for the contact datastructure is defined as a ratio of matching ticks to all ticks in the contact datastructure's time series of ticks.

31. A processor-implemented tactic identification search engine system, comprising:
  a tactic tracking, evaluation and identification component means, to:
    obtain, via at least one processor, a subscription request datastructure from a client, wherein the subscription request datastructure specifies a set of search targets;
    retrieve, via at least one processor, a set of tactic definition datastructures, wherein each tactic definition datastructure specifies a time series of rules that define a tactic;
    obtain, via at least one processor, a tick notification comprising tick data for a tick associated with a target;
    add, via at least one processor, a contact datastructure corresponding to each retrieved tactic definition datastructure to a tracking list of contact datastructures for the target, wherein each contact datastructure specifies a time series of ticks;
    append, via at least one processor, the tick data for the tick to a contact datastructure's time series of ticks, for each contact datastructure in the tracking list of contact datastructures for the target;
    evaluate, via at least one processor, a contact datastructure's time series of ticks with regard to the respective contact datastructure's corresponding time series of rules to classify the respective contact datastructure, for each contact datastructure in the tracking list of contact datastructures for the target;
    determine, via at least one processor, a set of identified tactic contact datastructures, from the evaluated contact datastructures, wherein each contact datastructure in the set of identified tactic contact datastructures is classified as an identified tactic;
determine, via at least one processor, that the target corresponds to a search target specified in the set of search targets; and
notify, via at least one processor, the client regarding the set of identified tactic contact datastructures.

32. The system of embodiment 31, wherein a search target is a security identifier.

33. The system of embodiment 31, wherein a tactic definition datastructure further specifies a minimum length, a maximum length, and a minimum signal to noise ratio.

34. The system of embodiment 31, wherein a rule in a time series of rules that define a tactic is associated with a time sequence.

35. The system of embodiment 31, wherein a rule in a time series of rules that define a tactic is defined relative to previously matched ticks.

36. The system of embodiment 31, wherein the tick data for the tick comprises trades data or quotes data for the target.

37. The system of embodiment 31, wherein a contact datastructure further comprises a match positions filter.

38. The system of embodiment 31, wherein a contact datastructure further comprises a datastructure containing copies of matching ticks.

39. The system of embodiment 31, further, comprising:
the tactic tracking, evaluation and identification component means, to:
apply, via at least one processor, a match positions filter to a contact datastructure's time series of ticks to determine ticks in the contact datastructure's time series of ticks that satisfied previously applied rules from the contact datastructure's corresponding time series of rules.

40. The system of embodiment 31, wherein the means to evaluate a contact datastructure's time series of ticks with regard to the respective contact datastructure's corresponding time series of rules further comprise means to evaluate the respective contact datastructure's time series of ticks with regard to a reject rule.

41. The system of embodiment 31, wherein the means to evaluate a contact datastructure's time series of ticks with regard to the respective contact datastructure's corresponding time series of rules further comprise means to evaluate the respective contact datastructure's time series of ticks with regard to a match rule.

42. The system of embodiment 31, further, comprising:
the tactic tracking, evaluation and identification component means, to:
evaluate, via at least one processor, a contact datastructure's time series of ticks with regard to a minimum length.

43. The system of embodiment 31, further, comprising:
the tactic tracking, evaluation and identification component means, to:
evaluate, via at least one processor, a contact datastructure's time series of ticks with regard to a maximum length.

44. The system of embodiment 31, further, comprising:
the tactic tracking, evaluation and identification component means, to:
evaluate, via at least one processor, a contact datastructure with regard to a minimum signal to noise ratio.

45. The system of embodiment 44, wherein a signal to noise ratio for the contact datastructure is defined as a ratio of matching ticks to all ticks in the contact datastructure's time series of ticks.

46. A processor-implemented tactic identification search engine method, comprising:
executing processor-implemented tactic tracking, evaluation and identification component instructions to:
obtain, via at least one processor, a subscription request datastructure from a client, wherein the subscription request datastructure specifies a set of search targets;
retrieve, via at least one processor, a set of tactic definition datastructures, wherein each tactic definition datastructure specifies a time series of rules that define a tactic;
obtain, via at least one processor, a tick notification comprising tick data for a tick associated with a target;
add, via at least one processor, a contact datastructure corresponding to each retrieved tactic definition datastructure to a tracking list of contact datastructures for the target, wherein each contact datastructure specifies a time series of ticks;
append, via at least one processor, the tick data for the tick to a contact datastructure's time series of ticks, for each contact datastructure in the tracking list of contact datastructures for the target;
evaluate, via at least one processor, a contact datastructure's time series of ticks with regard to the respective contact datastructure's corresponding time series of rules to classify the respective contact datastructure, for each contact datastructure in the tracking list of contact datastructures for the target;
determine, via at least one processor, a set of identified tactic contact datastructures, from the evaluated contact datastructures, wherein each contact datastructure in the set of identified tactic contact datastructures is classified as an identified tactic;
determine, via at least one processor, that the target corresponds to a search target specified in the set of search targets; and
notify, via at least one processor, the client regarding the set of identified tactic contact datastructures.

47. The method of embodiment 46, wherein a search target is a security identifier.

48. The method of embodiment 46, wherein a tactic definition datastructure further specifies a minimum length, a maximum length, and a minimum signal to noise ratio.

49. The method of embodiment 46, wherein a rule in a time series of rules that define a tactic is associated with a time sequence.

50. The method of embodiment 46, wherein a rule in a time series of rules that define a tactic is defined relative to previously matched ticks.

51. The method of embodiment 46, wherein the tick data for the tick comprises trades data or quotes data for the target.

52. The method of embodiment 46, wherein a contact datastructure further comprises a match positions filter.

53. The method of embodiment 46, wherein a contact datastructure further comprises a datastructure containing copies of matching ticks.

54. The method of embodiment 46, further, comprising:
executing processor-implemented tactic tracking, evaluation and identification component instructions to:
apply, via at least one processor, a match positions filter to a contact datastructure's time series of ticks to determine ticks in the contact datastructure's time series of ticks that satisfied previously applied rules from the contact datastructure's corresponding time series of rules.
55. The method of embodiment 46, wherein the instructions to evaluate a contact datastructure's time series of ticks with regard to the respective contact datastructure's corresponding time series of rules further comprise instructions to evaluate the respective contact datastructure's time series of ticks with regard to a reject rule.
56. The method of embodiment 46, wherein the instructions to evaluate a contact datastructure's time series of ticks with regard to the respective contact datastructure's corresponding time series of rules further comprise instructions to evaluate the respective contact datastructure's time series of ticks with regard to a match rule.
57. The method of embodiment 46, further, comprising:
executing processor-implemented tactic tracking, evaluation and identification component instructions to:
evaluate, via at least one processor, a contact datastructure's time series of ticks with regard to a minimum length.
58. The method of embodiment 46, further, comprising:
executing processor-implemented tactic tracking, evaluation and identification component instructions to:
evaluate, via at least one processor, a contact datastructure's time series of ticks with regard to a maximum length.
59. The method of embodiment 46, further, comprising:
executing processor-implemented tactic tracking, evaluation and identification component instructions to:
evaluate, via at least one processor, a contact datastructure with regard to a minimum signal to noise ratio.
60. The method of embodiment 59, wherein a signal to noise ratio for the contact datastructure is defined as a ratio of matching ticks to all ticks in the contact datastructure's time series of ticks.

In order to address various issues and advance the art, the entirety of this application for Tactic Tracking, Evaluation and Identification Engine Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a TTEIE individual and/or enterprise user, database configuration and/or relational model, data type, data transmission and/or network framework, syntax structure, and/or the like, various embodiments of the TTEIE, may be implemented that allow a great deal of flexibility and customization. For example, aspects of the TTEIE may be adapted for identifying constellations by searching through the sky (e.g., from east to west). While various embodiments and discussions of the TTEIE have included search engines, however, it is to be understood that the embodiments described herein may be readily configured and/or customized for a wide variety of other applications and/or implementations.

What is claimed is:

1. A tactic identification search engine apparatus, comprising:
a memory;
a component collection in the memory, including:
a tactic tracking, evaluation and identification component;
a processor disposed in communication with the memory, and configured to issue a plurality of processing instructions from the component collection stored in the memory,
wherein the processor issues instructions from the tactic tracking, evaluation and identification component, stored in the memory, to:
obtain, via at least one processor, a subscription request datastructure from a client, wherein the subscription request datastructure specifies a set of search targets;
retrieve, via at least one processor, a set of tactic definition datastructures, wherein each tactic definition datastructure specifies a time series of rules that define a tactic;
obtain, via at least one processor, a tick notification comprising tick data for a tick associated with a target;
add, via at least one processor, a contact datastructure corresponding to each retrieved tactic definition datastructure to a tracking list of contact datastructures for the target, wherein each contact datastructure specifies a time series of ticks;
append, via at least one processor, the tick data for the tick to a contact datastructure's time series of ticks, for each contact datastructure in the tracking list of contact datastructures for the target;
evaluate, via at least one processor, a contact datastructure's time series of ticks with regard to the respective contact datastructure's corresponding time series of rules to classify the respective contact datastructure, for each contact datastructure in the tracking list of contact datastructures for the target;
determine, via at least one processor, a set of identified tactic contact datastructures, from the evaluated contact datastructures, wherein each contact datastructure in the set of identified tactic contact datastructures is classified as an identified tactic;
determine, via at least one processor, that the target corresponds to a search target specified in the set of search targets; and
notify, via at least one processor, the client regarding the set of identified tactic contact datastructures.

2. The apparatus of claim 1, wherein a search target is a security identifier.

3. The apparatus of claim 1, wherein a tactic definition datastructure further specifies a minimum length, a maximum length, and a minimum signal to noise ratio.

4. The apparatus of claim 1, wherein a rule in a time series of rules that define a tactic is associated with a time sequence.

5. The apparatus of claim 1, wherein a rule in a time series of rules that define a tactic is defined relative to previously matched ticks.

6. The apparatus of claim 1, wherein the tick data for the tick comprises trades data or quotes data for the target.

7. The apparatus of claim 1, wherein a contact datastructure further comprises a match positions filter.

8. The apparatus of claim 1, wherein a contact datastructure further comprises a datastructure containing copies of matching ticks.

9. The apparatus of claim 1, further, comprising:
the processor issues instructions from the tactic tracking, evaluation and identification component, stored in the memory, to:
apply, via at least one processor, a match positions filter to a contact datastructure's time series of ticks to determine ticks in the contact datastructure's time series of ticks that satisfied previously applied rules from the contact datastructure's corresponding time series of rules.

10. The apparatus of claim 1, wherein the instructions to evaluate a contact datastructure's time series of ticks with regard to the respective contact datastructure's corresponding time series of rules further comprise instructions to evaluate the respective contact datastructure's time series of ticks with regard to a reject rule.

11. The apparatus of claim 1, wherein the instructions to evaluate a contact datastructure's time series of ticks with regard to the respective contact datastructure's corresponding time series of rules further comprise instructions to evaluate the respective contact datastructure's time series of ticks with regard to a match rule.

12. The apparatus of claim 1, further, comprising:
the processor issues instructions from the tactic tracking, evaluation and identification component, stored in the memory, to:
evaluate, via at least one processor, a contact datastructure's time series of ticks with regard to a minimum length.

13. The apparatus of claim 1, further, comprising:
the processor issues instructions from the tactic tracking, evaluation and identification component, stored in the memory, to:
evaluate, via at least one processor, a contact datastructure's time series of ticks with regard to a maximum length.

14. The apparatus of claim 1, further, comprising:
the processor issues instructions from the tactic tracking, evaluation and identification component, stored in the memory, to:
evaluate, via at least one processor, a contact datastructure with regard to a minimum signal to noise ratio.

15. The apparatus of claim 14, wherein a signal to noise ratio for the contact datastructure is defined as a ratio of matching ticks to all ticks in the contact datastructure's time series of ticks.

16. A tactic identification search engine processor-readable, non-transient physical medium storing a component collection, the component collection storage structured with processor-executable instructions comprising:
obtain, via at least one processor, a subscription request datastructure from a client, wherein the subscription request datastructure specifies a set of search targets;
retrieve, via at least one processor, a set of tactic definition datastructures, wherein each tactic definition datastructure specifies a time series of rules that define a tactic;
obtain, via at least one processor, a tick notification comprising tick data for a tick associated with a target;
add, via at least one processor, a contact datastructure corresponding to each retrieved tactic definition datastructure to a tracking list of contact datastructures for the target, wherein each contact datastructure specifies a time series of ticks;

append, via at least one processor, the tick data for the tick to a contact datastructure's time series of ticks, for each contact datastructure in the tracking list of contact datastructures for the target;
evaluate, via at least one processor, a contact datastructure's time series of ticks with regard to the respective contact datastructure's corresponding time series of rules to classify the respective contact datastructure, for each contact datastructure in the tracking list of contact datastructures for the target;
determine, via at least one processor, a set of identified tactic contact datastructures, from the evaluated contact datastructures, wherein each contact datastructure in the set of identified tactic contact datastructures is classified as an identified tactic;
determine, via at least one processor, that the target corresponds to a search target specified in the set of search targets; and
notify, via at least one processor, the client regarding the set of identified tactic contact datastructures.

17. A processor-implemented tactic identification search engine system, comprising:
means to store a component collection;
means to process processor-executable instructions from the component collection, the component collection storage structured with processor-executable instructions including:
obtain, via at least one processor, a subscription request datastructure from a client, wherein the subscription request datastructure specifies a set of search targets;
retrieve, via at least one processor, a set of tactic definition datastructures, wherein each tactic definition datastructure specifies a time series of rules that define a tactic;
obtain, via at least one processor, a tick notification comprising tick data for a tick associated with a target;
add, via at least one processor, a contact datastructure corresponding to each retrieved tactic definition datastructure to a tracking list of contact datastructures for the target, wherein each contact datastructure specifies a time series of ticks;
append, via at least one processor, the tick data for the tick to a contact datastructure's time series of ticks, for each contact datastructure in the tracking list of contact datastructures for the target;
evaluate, via at least one processor, a contact datastructure's time series of ticks with regard to the respective contact datastructure's corresponding time series of rules to classify the respective contact datastructure, for each contact datastructure in the tracking list of contact datastructures for the target;
determine, via at least one processor, a set of identified tactic contact datastructures, from the evaluated contact datastructures, wherein each contact datastructure in the set of identified tactic contact datastructures is classified as an identified tactic;
determine, via at least one processor, that the target corresponds to a search target specified in the set of search targets; and
notify, via at least one processor, the client regarding the set of identified tactic contact datastructures.

18. A processor-implemented tactic identification search engine method, comprising:
executing processor-implemented tactic tracking, evaluation and identification component instructions to:
obtain, via at least one processor, a subscription request datastructure from a client, wherein the subscription request datastructure specifies a set of search targets;
retrieve, via at least one processor, a set of tactic definition datastructures, wherein each tactic definition datastructure specifies a time series of rules that define a tactic;
obtain, via at least one processor, a tick notification comprising tick data for a tick associated with a target;
add, via at least one processor, a contact datastructure corresponding to each retrieved tactic definition datastructure to a tracking list of contact datastructures for the target, wherein each contact datastructure specifies a time series of ticks;
append, via at least one processor, the tick data for the tick to a contact datastructure's time series of ticks, for each contact datastructure in the tracking list of contact datastructures for the target;
evaluate, via at least one processor, a contact datastructure's time series of ticks with regard to the respective contact datastructure's corresponding time series of rules to classify the respective contact datastructure, for each contact datastructure in the tracking list of contact datastructures for the target;
determine, via at least one processor, a set of identified tactic contact datastructures, from the evaluated contact datastructures, wherein each contact datastructure in the set of identified tactic contact datastructures is classified as an identified tactic;
determine, via at least one processor, that the target corresponds to a search target specified in the set of search targets; and
notify, via at least one processor, the client regarding the set of identified tactic contact datastructures.

* * * * *